United States Patent [19]

Haruki et al.

[11] Patent Number: 5,489,939
[45] Date of Patent: Feb. 6, 1996

[54] WHITE BALANCE ADJUSTING APPARATUS FOR AUTOMATICALLY ADJUSTING WHITE BALANCE IN RESPONSE TO A COLOR INFORMATION SIGNAL OBTAINED FROM AN IMAGE SENSING DEVICE

[75] Inventors: Toshinobu Haruki, Shijonawate; Kenichi Kikuchi, Daito, both of Japan

[73] Assignee: Sanyo Electric Co., Ltd., Japan

[21] Appl. No.: 360,987

[22] Filed: Dec. 20, 1994

Related U.S. Application Data

[62] Division of Ser. No. 612,831, Nov. 13, 1990.

[30] Foreign Application Priority Data

| Nov. 17, 1989 | [JP] | Japan | 1-300239 |
| Dec. 26, 1989 | [JP] | Japan | 1-337352 |
| Feb. 28, 1990 | [JP] | Japan | 2-47915 |
| Mar. 9, 1990 | [JP] | Japan | 2-58652 |
| Mar. 28, 1990 | [JP] | Japan | 2-80102 |
| Apr. 5, 1990 | [JP] | Japan | 2-90902 |

[51] Int. Cl.⁶ .............................. H04N 9/64; H04N 9/73
[52] U.S. Cl. ...................... 348/223; 348/655; 348/225
[58] Field of Search ........................... 348/223, 225, 348/227, 655, 657; H04N 9/64, 9/73

[56] References Cited

U.S. PATENT DOCUMENTS

| 4,709,259 | 11/1987 | Suzuki | 358/48 |
| 4,748,497 | 5/1988 | Sengoku | 358/29 |
| 4,809,061 | 2/1989 | Suzuki | 358/75 |
| 4,829,382 | 5/1989 | Hess et al. | 358/228 |
| 4,883,360 | 11/1989 | Kawada et al. | 356/402 |
| 5,021,874 | 6/1991 | Tsugita | 358/29 |
| 5,038,205 | 8/1991 | Kondo et al. | 358/29 |
| 5,099,316 | 3/1992 | Ogawa | 358/41 |
| 5,146,323 | 9/1992 | Kobori et al. | 358/76 |
| 5,223,921 | 6/1993 | Haruki et al. | 358/29 |
| 5,282,022 | 1/1995 | Haruki et al. | 348/223 |
| 5,282,024 | 1/1995 | Takei | 348/223 |

FOREIGN PATENT DOCUMENTS

| 0356123 | 2/1990 | European Pat. Off. |
| 2608881 | 7/1987 | France |
| 52523 | 4/1977 | Japan |
| 15381 | 1/1983 | Japan |
| 62-35792 | 2/1987 | Japan |
| 62-132490 | 6/1987 | Japan |
| 146393 | 2/1989 | Japan |

Primary Examiner—James J. Groody
Assistant Examiner—Glenton B. Burgess
Attorney, Agent, or Firm—Peter L. Michaelson; John C. Pokotylo

[57] ABSTRACT

Sixty-four regions are established on an image sensed picture from a video camera, where evaluating value $r_{ij}$, $b_{ij}$, and $y_{ij}$ is obtained by averaging color difference signals R-Y and B-Y and luminance signal Y obtained from an image sensing signal for over 1 field period for each region. When the apparatus determines that the difference in the evaluating values between two adjacent regions do not exceed a predetermined value, that is, when that continuing regions have the same color, the weighing amount of the color evaluating values of a corresponding region is adjusted to limit its effect upon the gain control signals used to adjust the gain of the color signal amplifiers. As a result, the effect of objects of the same color towards white balance adjustment is reduced.

10 Claims, 30 Drawing Sheets

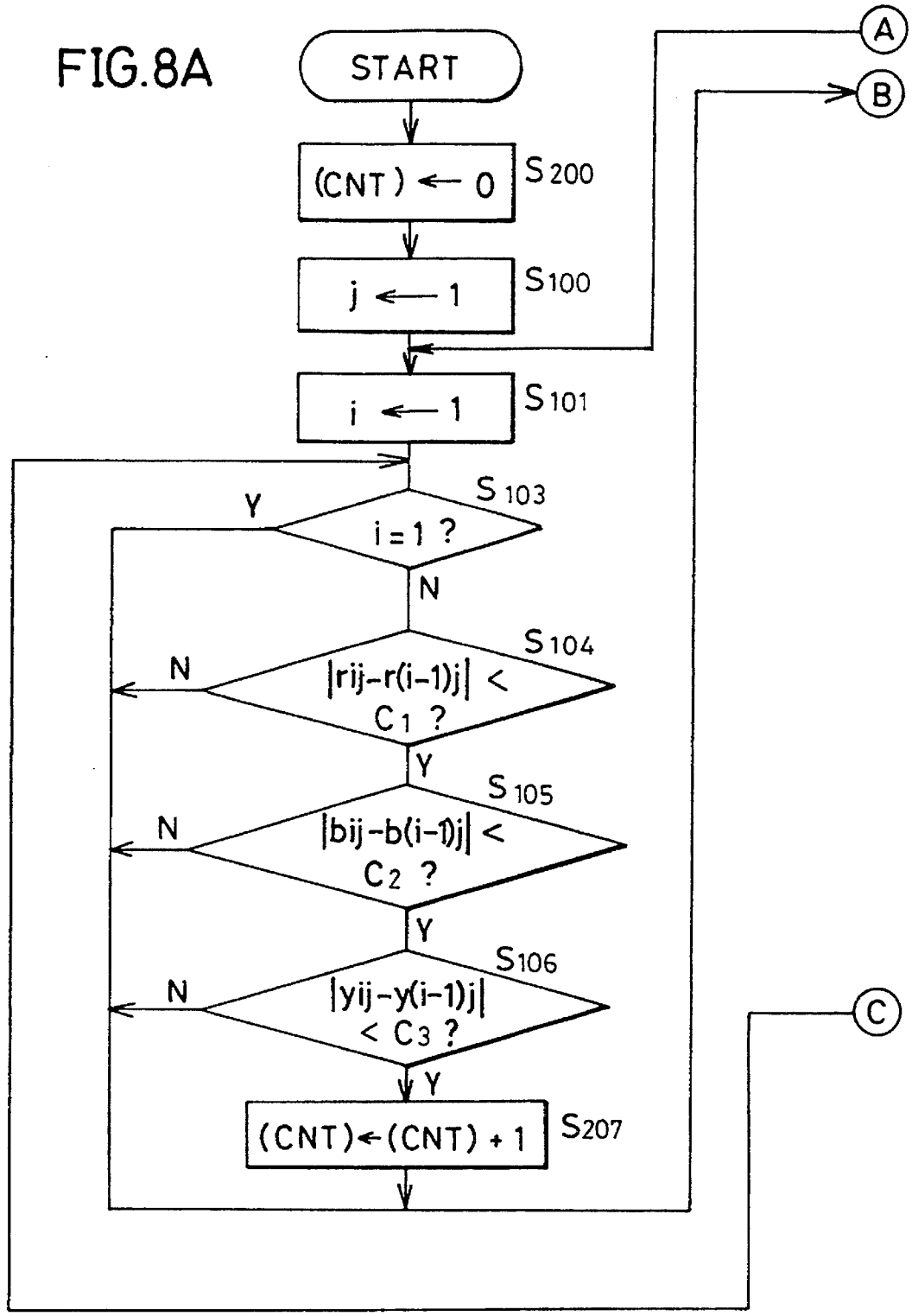

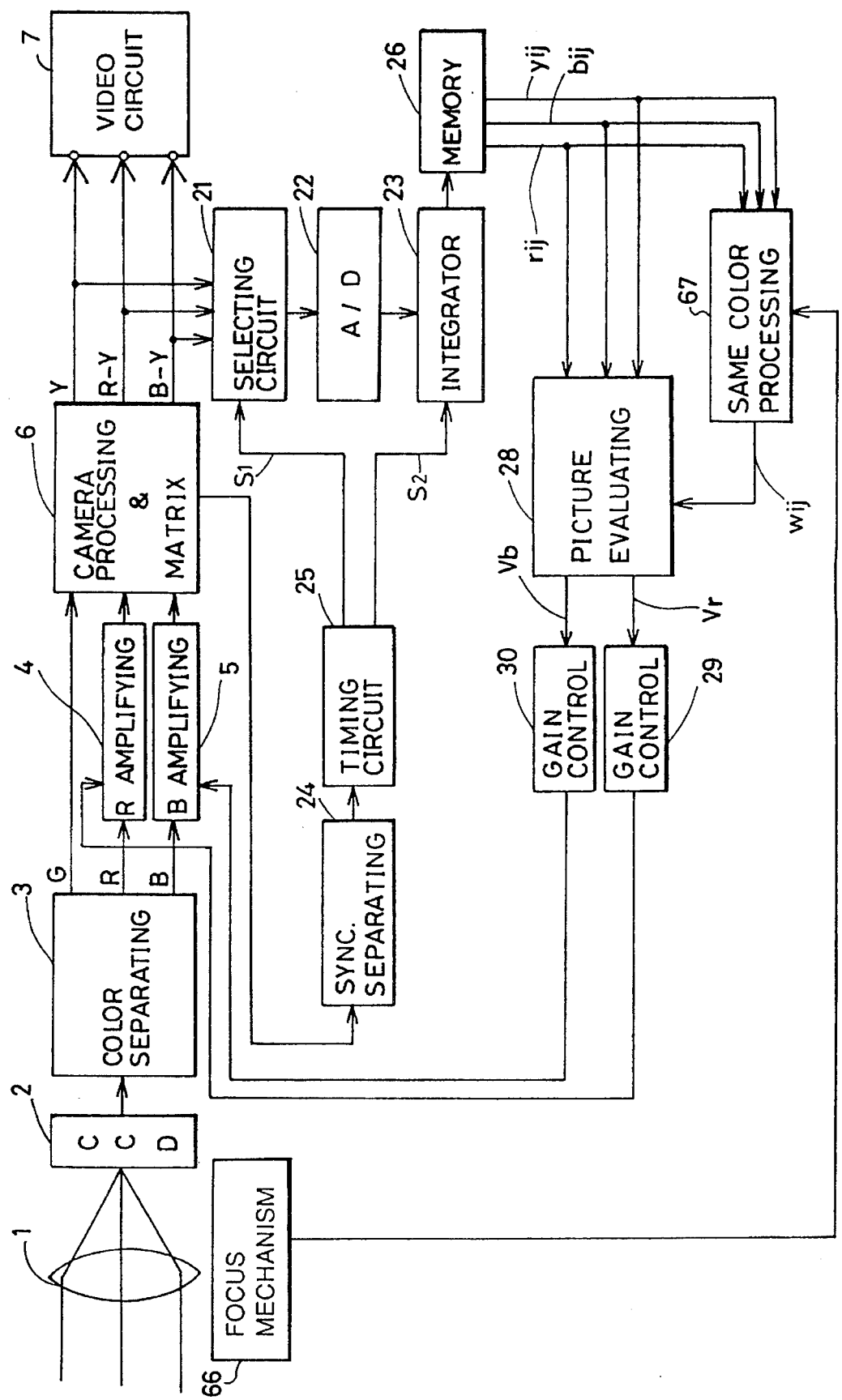

WHITE BALANCE ADJUSTING APPARATUS FOR AUTOMATICALLY ADJUSTING WHITE BALANCE IN RESPONSE TO A COLOR INFORMATION SIGNAL OBTAINED FROM AN IMAGE SENSING DEVICE

This application is a division of our patent application Ser. No. 07/612,831 filed on Nov. 13, 1990.

BACKGROUND OF THE INVENTION

1. Field of the Invention

The present invention relates to a white balance adjusting apparatus, and more particularly to a white balance adjusting apparatus in an image sensing apparatus such as a color video camera, for automatically adjusting white balance to correct the wavelength distribution of light from differing light sources. The adjustment is accomplished in response to color information signal within the image sensing signal obtained from an image sensing device.

2. Description of the Background Art

In taking an object using an image sensing apparatus such as a color video camera, the wavelength distribution of light illuminating the object from a light source differs by the type of the light source. For example, the blue components are intensive in light from a light source of relatively high temperature, whereas the red components are intensive in light from a light source of relatively low temperature. It is therefore necessary to correct the wavelength distribution of each light source in order to properly reproduce the color tone of the object itself illuminated with light of the light source on the screen of a color monitor television receiver. This correction is generally called white balance adjustment, where the gain of each color signal is adjusted so that the ratio of the amplitudes of the three primary color signals of red (hereinafter referred to as R), blue (hereinafter referred to as B), and green (hereinafter referred to as G) is 1:1:1.

In conventional image sensing apparatus, the detection of the three primary color signals R, G, and B is carried out according to light around the image sensing apparatus using a sensor provided for each color. However, white balance could not be adjusted correctly with such image sensing apparatus when the light source around the image sensing apparatus (for example, fluorescent light) differs from the light source illuminating the object (for example, the sun), as in the case where an outdoor scene is taken from inside a room.

Recently, a method called TTL (through-the-lens) is proposed in which white balance adjustment is carried out, without providing separate sensors, according to color difference signals R-Y and B-Y within the image sensing signal obtained from an image sensing device. Such a method is disclosed in Japanese Patent Laying-Open No. 62-35792, for example. This method is based on the consideration that the object taken by an image sensing apparatus has various color area distribution (hereinafter referred to as the color distribution) and if this color distribution is averaged over a sufficient long time, the color components cancel each other to result in each color signal on "0", which is equivalent to a state of taking a completely white picture. By controlling the gains of respective color signals so that the values resulting from integration of color difference signals R-Y and B-Y over one field period, for example, become 0, to correct the offset of the color tone due to wavelength distribution of light of the light source is corrected.

FIG. 1 is a block diagram showing an example of a conventional white balance adjusting apparatus by the TTL method. Referring to FIG. 1, light from an object (not shown) enters an image sensing device 2 formed of a CCD via a lens 1. The incident light is converted by a photoelectric device into an electric signal and provided to a color separating circuit 3. Color separating circuit 3 extracts the three primary color signals of R, G, and B from this electric signal. The extracted G signal is directly provided to a camera processing and matrix circuit 6. The R signal and B signal are provided to camera processing and matrix circuit 6 via a variable gain R amplifying circuit 4 and a B amplifying circuit 5, respectively. Camera processing and matrix circuit 6 creates a luminance signal Y and color difference signals R-Y and B-Y according to the three primary color signals of G, R, and B. The outputs are provided to a video circuit 7 where luminance signal Y and color difference signals R-Y and B-Y are subjected to the well-known process to create a recordable video signal. This recordable video signal is provided to a video recording circuit not shown.

The two color difference signals R-Y and B-Y are applied to integrating circuits 18 and 17, respectively, to be integrated over a sufficient long time, for example over 1 field period of a video signal. The values resulting from the integration are provided to gain control circuits 13 and 14. Gain control circuits 13 and 14 control the variable gains of B amplifying circuit 5 and R amplifying circuit 4 so that the values resulting from integration each becomes 0. This results in the amplitude ratio of 1:1:1 of the three primary color signals G, R, and B to adjust white balance.

The conventional white balance adjusting apparatus of FIG. 1, corrects the irregularity of the wavelength distribution due to light of the light source, based on the consideration that colors cancel each other so that he reproduced picture can approximate a substantially white picture if the various color distributions of the object itself are averaged over a long period. This method is inaccurate when white balance regarding the object itself can not be achieved because the reproduced picture can not approximate a white picture even if the color distributions of the object included in the entire picture are averaged. This arises when the area ratio of the three primary colors within the picture is not equal, that is to say, when the color distribution is not even, such as in the case where green lawn or a blue sky occupies a large area of the picture, or in the case where a human object wearing a red sweater is taken in a close-up manner. If the above mentioned white balance adjustment is applied to such an unbalanced state of white balance, the gain will be controlled so as to cancel the intensive color. In the case of a close-up of a person wearing a red sweater, white balance will be intense in blue, resulting in the color of the object being improperly reproduced on the screen.

This problem is described theoretically hereinafter. FIG. 2 is a graph showing the changes of color difference signals R-Y obtained in the case where a light of the light source illuminates a white color object as the color temperature of the light source changes. The ordinate indicates the red color difference signal R-Y whereas the abscissa indicates the blue color difference signal B-Y. As the color temperature of the light source changes, the color information of the screen, i.e. , the obtained color difference signals vary only within a distribution range in the vicinity of a fixed locus (called the light source color temperature axis) crossing the origin, i.e. the white region.

In ordinary image sensing situations, there are many cases where an object of chromatic colors having color information not in the distribution range, for example, an object having colors such as green, yellow, or magenta, occupies a large area of the picture. The obtained color information, i.e., the color difference signals not within the distribution range do not consider the light source color temperature and are not appropriate as color information for white balance adjustment. It is desirable that these color difference signals are not considered.

The light source color temperature axis crosses the origin (white color), as shown in FIG. 2, where the color difference signal of red is reduced as the color difference signal of blue increases (the fourth quadrant), and the color difference signal of red increases as the color difference signal of blue is reduced (the second quadrant). The first and third quadrants do not include the light source color temperature axis, that is to say, the color information of a region with particularly high chroma does not consider the light source color temperature and is not adequate as the fundamental information of white balance adjustment. This means that when an object having significantly high chroma is included in the picture, the color distribution average of the entire picture does not show an achromatic color due to the effect of high chroma. The unnecessary white balance adjustment causes the white balance to be intense in the complementary color of the high chroma color. Thus, the color of the object cannot be properly reproduced.

The situation where the green portion such as the lawn or a plant occupies a large area on the picture is very common in the case of taking a high chroma object. When the color distribution of the object is intense in green, the color difference signals R-Y and B-Y obtained are both negative values to be included in the third quadrant of FIG. 2. Such color difference signals do not consider the color temperature of the light source and should not be regarded in white balance adjustment. This situation of taking green objects may occur frequently, necessitating a particular solution.

SUMMARY OF THE INVENTION

An object of the present invention is to provide a white balance adjusting apparatus capable of appropriate automatic white balance adjustment even in the case where color distribution of the object is not even.

Another object of the present invention is to provide a white balance adjusting apparatus capable of appropriate automatic white balance adjustment even in the case where an object occupies a large area of the picture having color information not within a distribution range of color information due to a color temperature variation of a light source.

A further object of the present invention is to provide a white balance adjusting apparatus capable of appropriate automatic white balance adjustment even in the case where an object of significantly high chroma is included in the picture.

A still further object of the present invention is to provide a white balance adjusting apparatus capable of appropriate automatic white balance adjustment even in the case where a green object is included in the picture.

Briefly stated, the present invention is a white balance adjusting apparatus for automatically adjusting white balance in response to a plurality of color information signals obtained from an image sensing apparatus having a lens and an image sensing device. The white balance adjusting apparatus includes an amplifying circuit, a region setting circuit, a color evaluating value converting circuit, a gain control circuit, and a weight reducing circuit. The amplifying circuit amplifies each color information signal with a corresponding variable gain. The region setting circuit divides the image sensed picture into a plurality of regions on the image sensed picture. The color evaluating value converting circuit averages each of the plurality of color information signals and converts the same into a color evaluating value for each of the plurality of regions. The gain control circuit controls the variable gain of the amplifying circuit according to each color evaluating value of each region. The weight reducing circuit reduces the contribution degree of each color evaluating value towards the control of the variable gain in regions where the amount of fluctuation of the color evaluating value between continuous regions is smaller than a reference value.

In accordance with another aspect of the present invention, the reference value associated with the amount of fluctuation of the color evaluating values in continuous regions is a variable value.

In accordance with a further aspect of the present invention, the contribution degree of the corresponding color evaluating value towards the variable gain control is limited, when each color evaluating value of each of the plurality of regions is not included within a predetermined range.

In accordance with a still further aspect of the present invention, the contribution degree of the corresponding color evaluating value towards the variable gain control is limited, when each color evaluating value of each of the plurality of regions exceeds a predetermined value indicating green.

In accordance with a yet still further aspect of the present invention, the corresponding color evaluating value is corrected to a value within a distribution range, when each color evaluating value of each of the plurality of regions is not included within a predetermined distribution range of a color evaluating value due to a color temperature variation of a light source.

In accordance with another aspect of the present invention, the corresponding gain control signal is corrected to a value within the distribution range, when the gain control signal is not included within a predetermined distribution range of a gain control signal due to a color temperature variation of a light source.

The main advantage of the present invention lies in that the offset of white balance to the side of the complementary color of the object's color is suppressed, even in the case where an object of the same color occupies a large area of the picture.

Another advantage of the present invention lies in that effective color information regarding white balance adjustment can be selected more appropriately according to the focal length of the lens, the object distance, and the like.

Another advantage of the present invention lies in that white balance adjustment using the complementary color of a high chroma component can be suppressed by reducing the contribution degree of the object's color information towards white balance adjustment, even in the case where a high chroma object exists in the picture.

A still further advantage of the present invention lies in that white balance is not offset to the direction of canceling green color, even in the case where a green object not appropriate for white balance adjustment occupies a large area in the picture.

Another advantage of the present invention lies in that proper white balance can be carried out even in the case where an object is taken having a color not within the range of color temperature distribution and not appropriate for white balance adjustment.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 8A and 8B are flow charts for explaining the operation of the second embodiment of FIG. 7.

FIG. 16 is a block diagram showing a white balance adjusting apparatus of a fourth embodiment of the present invention.

DESCRIPTION OF THE PREFERRED EMBODIMENTS

Figure 3:
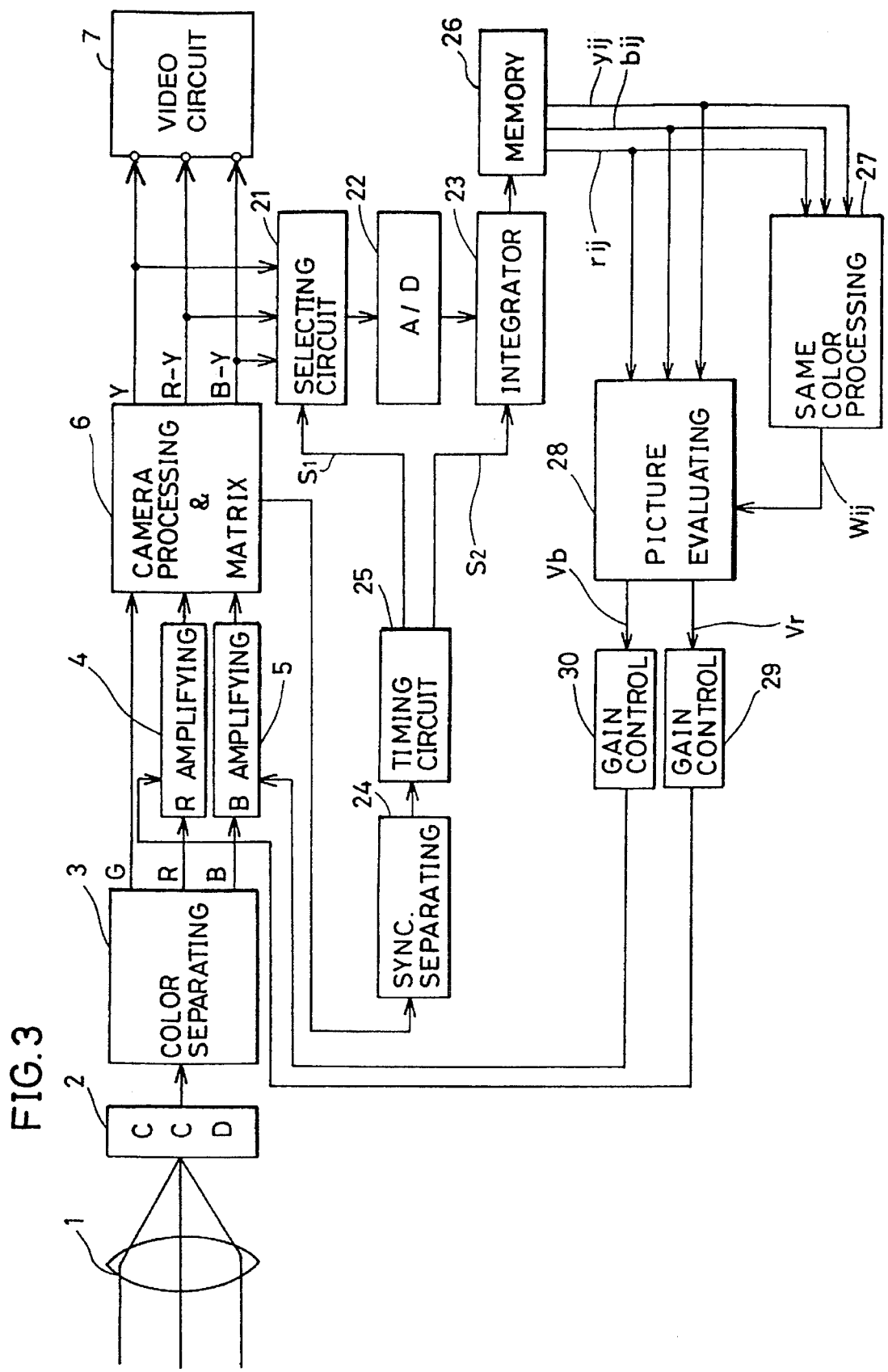
FIG. 3 is a block diagram showing a white balance adjusting apparatus of a first embodiment of the present invention.

FIG. 3 is a block diagram showing a white balance adjusting apparatus of a first embodiment of the present invention. Referring to FIG. 3, light from an object (not shown) enters an image sensing device 2 formed of a CCD via a lens 1. The incident light is converted by a photoelectric device into an electric signal and applied to a color separating circuit 3. Color separating circuit 3 extracts the three primary color signals of R, G and B from the electric signal. The extracted G signal is directly provided to a camera processing and matrix circuit 6, whereas signals R and B are provided to camera processing and matrix circuit 6 via a gain variable R amplifying circuit 4 and a B amplifying circuit 5, respectively. Camera processing and matrix circuit 6 produces luminance signal Y and color difference signals R-Y and B-Y according to the three primary color signals of G, R and B, and provides the outputs to a video circuit 7. Well-known processing is carried out on luminance signal Y, and on color difference signals R-Y and B-Y in video circuit 7 to produce a recordable video signal. This signal is provided to a recording circuit not shown.

Simultaneously, each of signals Y, R-Y, and B-Y is provided to a selecting circuit 21. Selecting circuit 21 is responsive to a selection signal S1 produced by a timing circuit 25 according to a vertical synchronizing signal provided from a synchronizing separating circuit 24, to sequentially select one signal out of luminance signal Y, color difference signal R-Y, and color difference signal B-Y for each 1 field. In the embodiment of FIG. 3 for example, the luminance signal or the color difference signal is selected for each field in the order of (Y)→(R-Y)→(B-Y)→(Y)→(R-Y)→. . . . The selected signal is provided to the succeeding stage A/D converter 22.

A/D converter 22 samples one of signals Y, R-Y, and B-Y selected by selecting circuit 21 with a predetermined sampling period to convert into a digital value. The converted value is provided to an integrator 23.

Meanwhile, timing circuit 25 produces a switching signal S2 according to vertical and horizontal synchronizing signals provided from camera processing and matrix circuit 6, and the fixed output of an oscillator (not shown) for driving CCD 2. Switching signal S2 is provided to integrator 23. Integrator 23 is responsive to switching signal S2 to divide the image sensed picture into 8×8=64 rectangular regions $A_{11}$, $A_{12}$, $A_{13}$, . . . $A_{ij}$ (i, j=an integer of 1–8) each of an identical area, for deriving the output of selecting circuit 21 in time divisional manner for each region.

More specifically, integrator 23 receives switching signal S2 to add the A/D converted values output from selecting circuit 21 over 1 field period for each region, i.e., digital-integrate the output of selecting circuit 21 for each region of the 64 regions, to hold the digital-integrated value corresponding to each region as a luminance evaluating value or a color evaluating value in memory 26, after integration within 1 field period is completed. The digital-integrated value of luminance signal Y corresponding to respective ones of the 64 regions are obtained as 64 luminance evaluating values $y_{ij}$ (i, j: 1–8) in an arbitrary field. In the next field where color difference signal R-Y is selected by selecting circuit 21, the digital-integrated values for respective regions of the color difference signal R-Y are obtained as 64 color evaluating values $r_{ij}$ as a result of integration for respective region by integrator 23. At a further next field where color difference signal B-Y is selected by selecting circuit 21, the digital-integrated value for respective regions of color difference signal B-Y are obtained as 64 color evaluating values $b_{ij}$ as the result of integration for respective regions by integrator 23.

When integration of luminance signal Y, and color difference signals R-Y and B-Y over 3 field periods is completed, a total 64×3=192 of luminance evaluating values $y_{ij}$ and color evaluating values $r_{ij}$ and $b_{ij}$ are held in memory 26. Similar operation is repeated where a new luminance evaluating value $y_{ij}$ is applied to memory 26 at the next field. At a further next field, color evaluating value $r_{ij}$ is applied to memory 26. The luminance evaluating value and color evaluating values held in memory 26 are sequentially updated.

Figure 5:
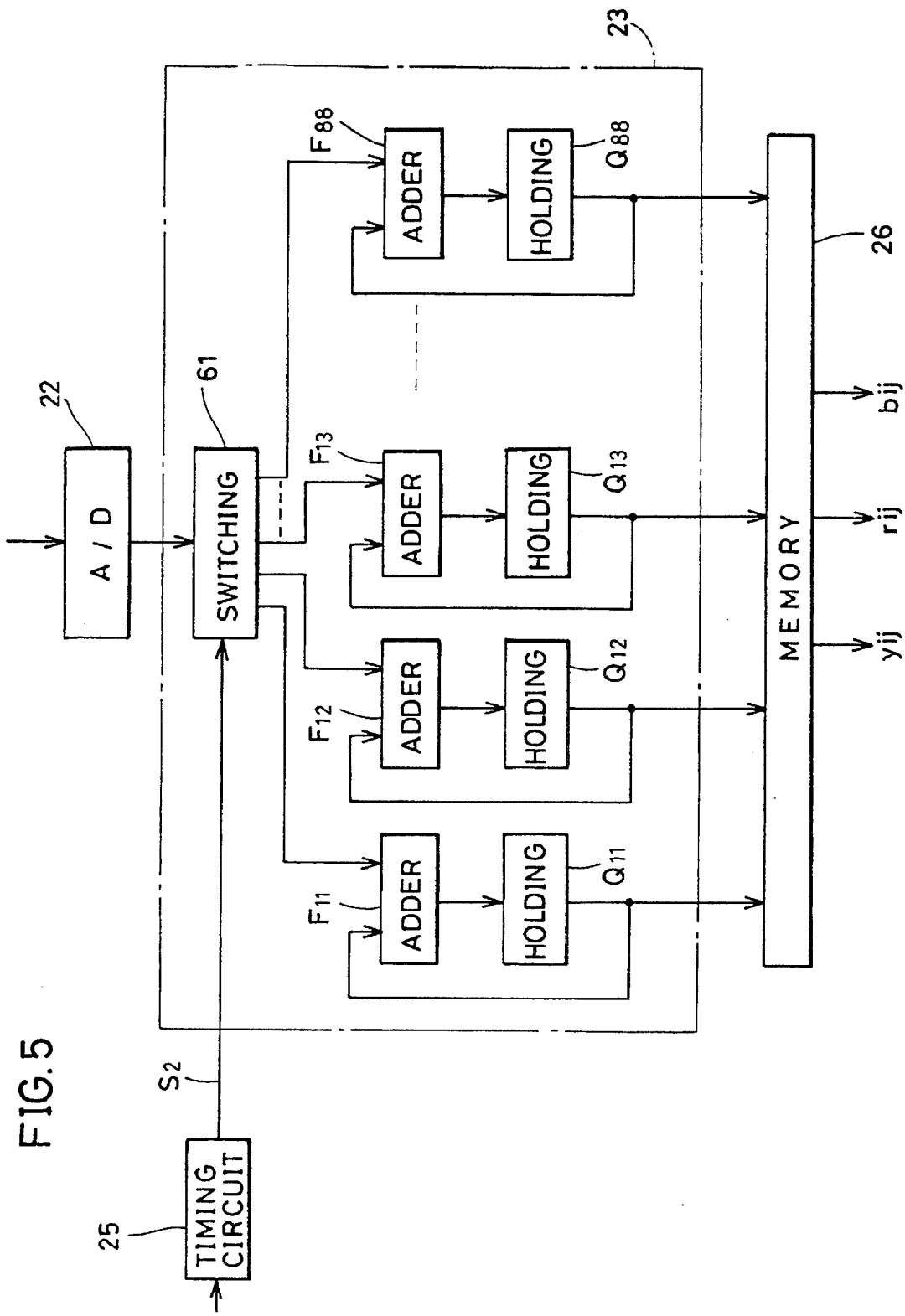
FIG. 5 is a block diagram showing the detail of the integrator of FIG. 3.

FIG. 5 is a block diagram of integrator 23 in detail. Each A/D converted data provided from A/D converter 22 is provided to a switching circuit 61. Switching circuit 61 receives switching signal S2 from timing circuit 25 for providing each A/D converted value into an adder corresponding to the region where the sampling point of the corresponding A/D converted data exists, out of the 64 adders $F_{11}, F_{12}, \ldots, F_{88}$ corresponding to the 64 regions $A_{11}, A_{12}, \ldots, A_{88}$. For example, if a sampling point of an arbitrary A/D converted data is included in region $A_{11}$, switching circuit 61 provides this data to adder $F_{11}$ corresponding to region $A_{11}$.

In the succeeding stage of each adder $F_{ij}$, a holding circuit $Q_{ij}$ is provided, where the output of each adder is first held in the corresponding holding circuit. The data held in each holding circuit is applied to a corresponding adder again and added with the next applied A/D converted data. Although each holding circuit $Q_{ij}$ is reset by each 1 field in response to a vertical synchronizing signal, only the data held immediately before reset is provided to memory 26. Thus, each one digital integrating circuit is composed of an adder and a holding circuit. Accordingly, integrator 23 is composed of a total of 64 digital integrating circuits. This means that a digital-integrated value corresponding to each of 64 regions is applied to memory 26 from the holding circuit for each field.

Figure 1:
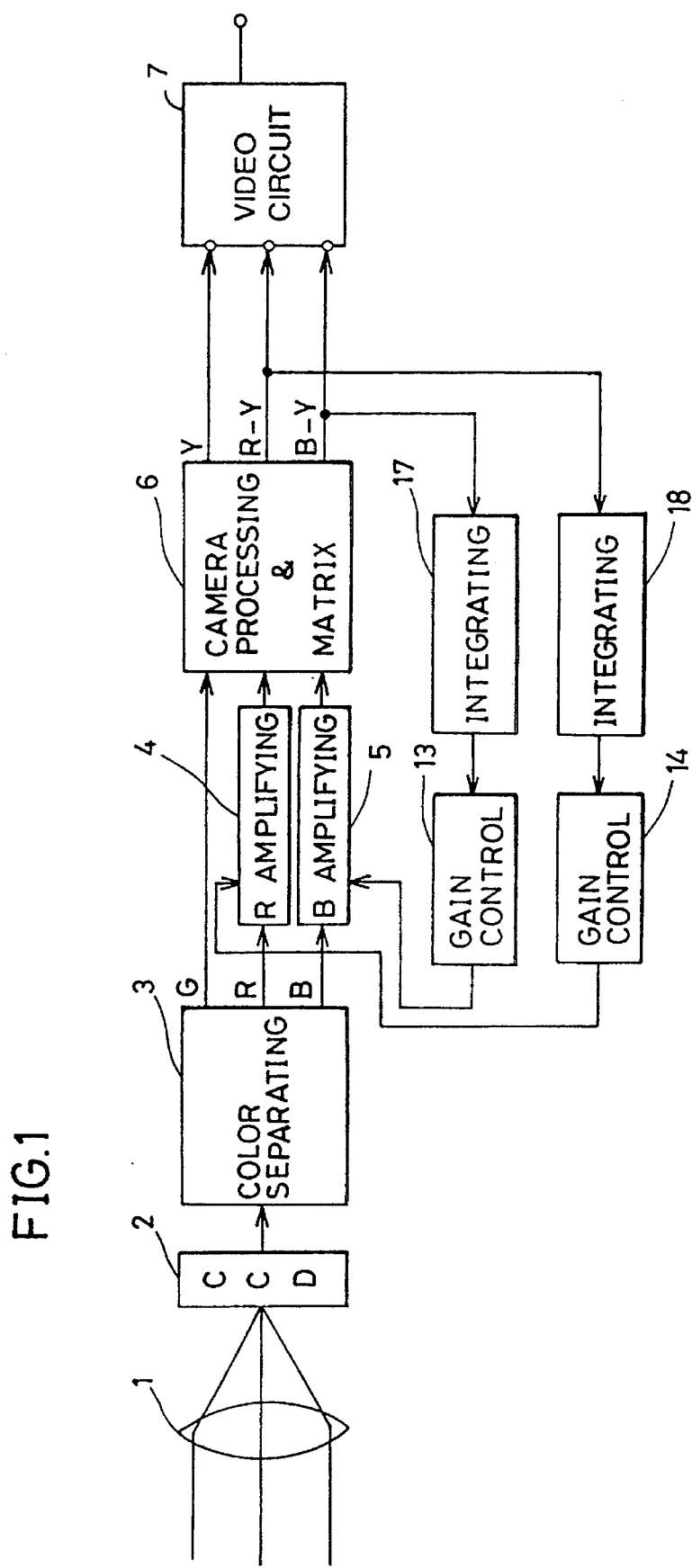
FIG. 1 is a block diagram showing an example of a conventional white balance adjusting apparatus.
Figure 2:
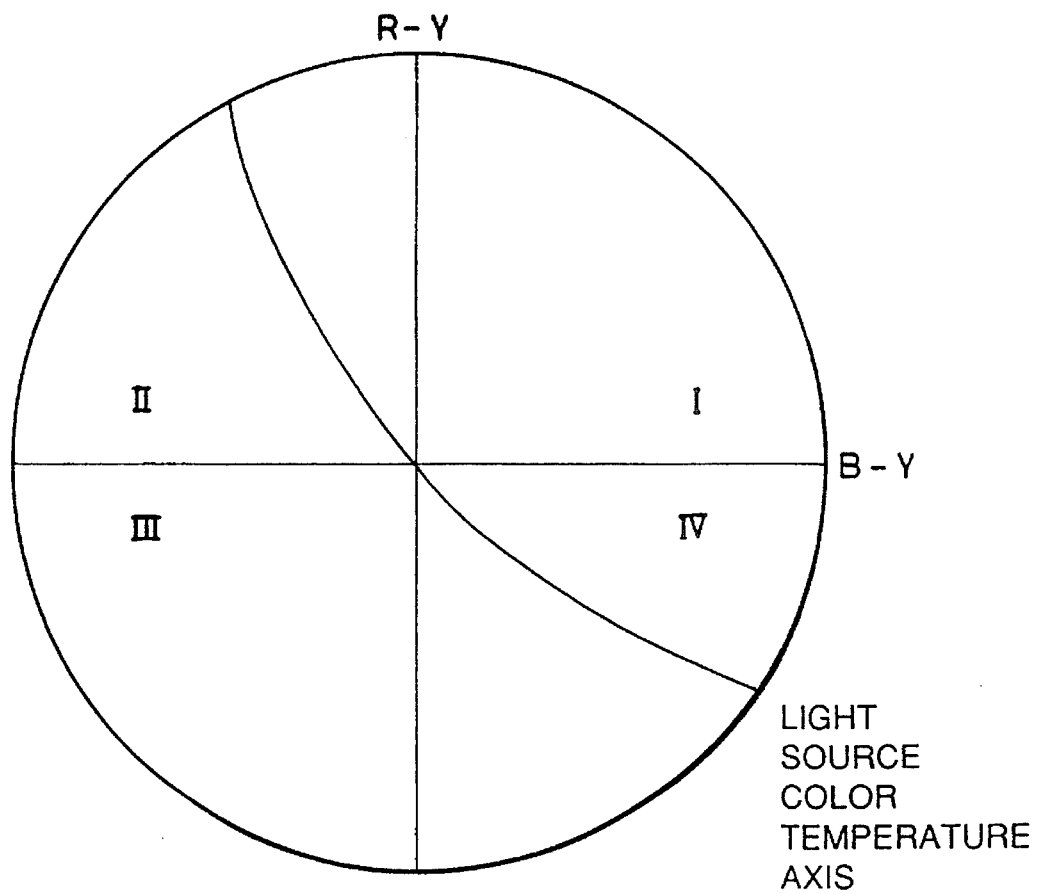
FIG. 2 is a graph showing color information obtained as the light source color temperature varies.

The reference level, i.e. the 0 level, of each of the two color difference signals R-Y and B-Y provided to A/D converter 22 is set in advance to a level obtained when a complete achromatic color picture is taken. Therefore, the value obtained by A/D converting the color difference signal may take not only a positive value, but a negative value, as shown in FIG. 2.

Referring to FIG. 3 again, the latest evaluating values $y_{ij}$, $r_{ij}$, and $b_{ij}$ resulting from integration and held in memory 26 are applied to a same-color-processing circuit 27. The same-color-processing circuit 27 determines whether a plurality of regions continuing in the vertical direction or the horizontal direction of the 64 regions has the same color or not. The result is used to determine the weighing amount of each region.

Figure 6:
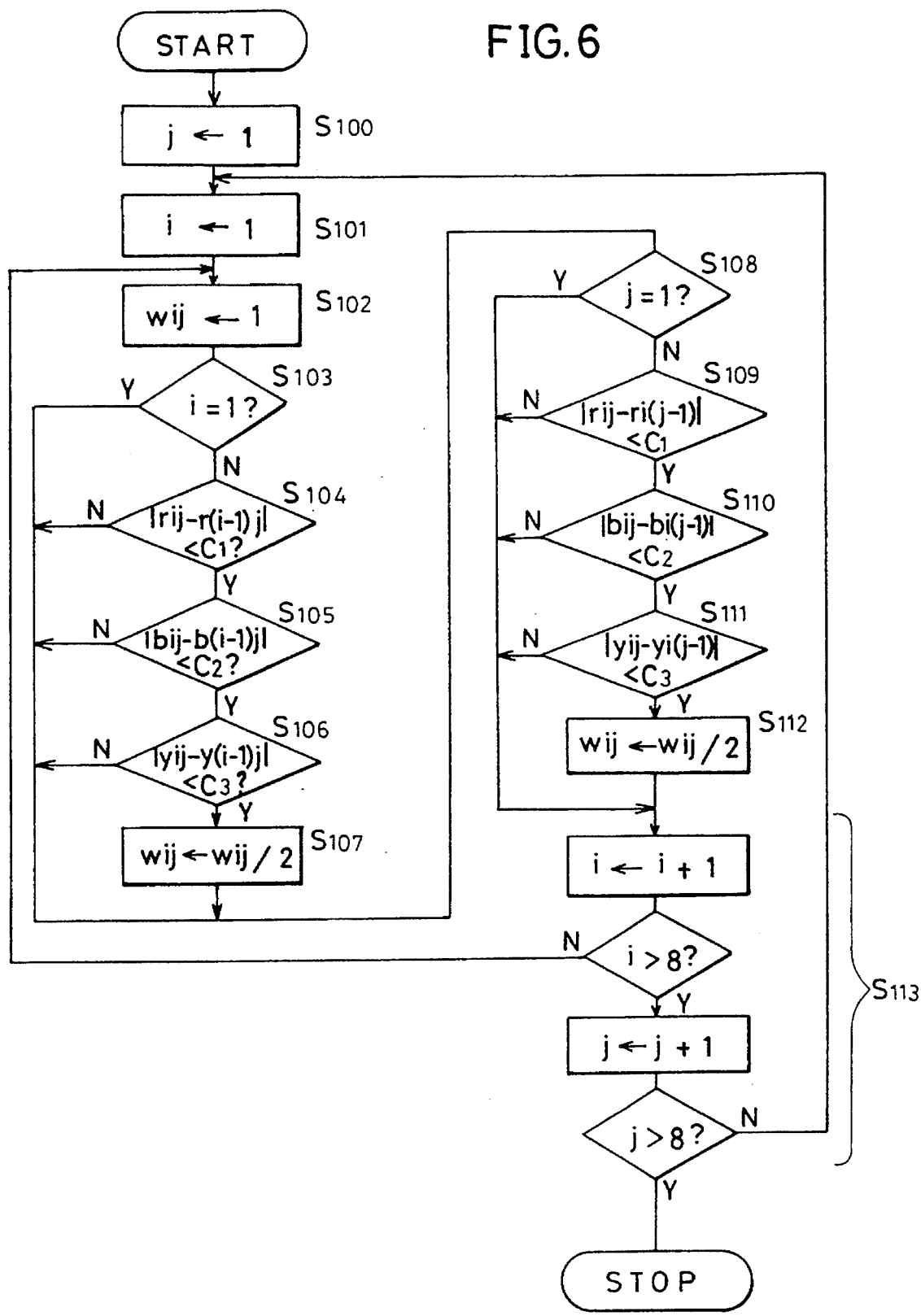
FIG. 6 is a flow chart for explaining the operation of a first embodiment of FIG. 3.

FIG. 6 is a flow chart for explaining the operation of same-color-processing circuit 27. At steps S100 and S101, initialization for determining the same color from region $A_{11}$ is carried out. At step S102, initialization of weighing amount $w_{ij}$ of each region is carried out, where the weighing amount of all 64 regions are each set to 1.

Figure 4:
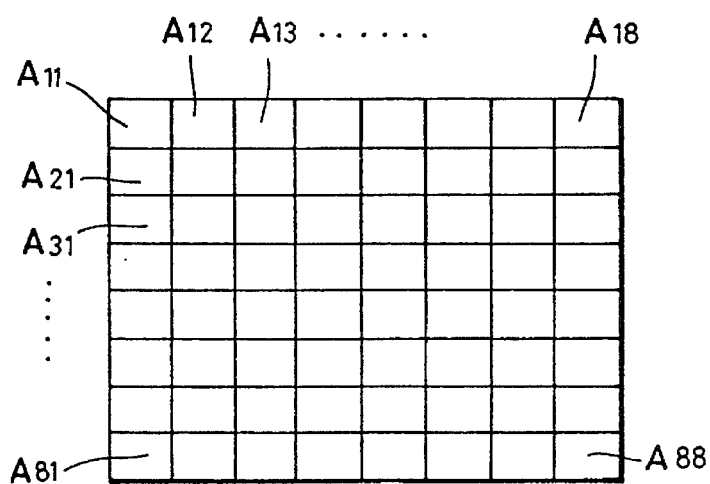
FIG. 4 is a diagram schematically showing the regions set in the image sensed picture.

Regarding the eight regions $A_{11}$–$A_{18}$ aligning on the topmost row of the picture (FIG. 4), the procedure for determining the same color, explained afterwards, is not necessary because regions above do not exist. If the region is determined as the top row region of the screen at step S103, the determination steps of S104–S106 explained hereinafter are bypassed.

If determination is made that the region is not the top row region of the picture at step S103, determination is made whether the difference of the color evaluating values $|r_{ij} - r_{(i-1)j}|$ regarding color difference signal R-Y between adjacent regions in the vertical direction exceeds a predetermined value C1 or not at next step S104. In a similar manner, at step S105, determination is made whether the color evaluating value difference $|b_{ij} - b_{(i-1)j}|$ regarding color difference signal B-Y between adjacent regions in the vertical direction exceeds a predetermined value C2 or not. At step S106, determination is made whether the luminance evaluating value difference $|y_{ij} - y_{(i-1)j}|$ between adjacent regions in the vertical direction exceeds a predetermined value C3 or not at next step S104. If none of the differences of the evaluating values exceed the corresponding predetermined values of C1, C2, and C3, determination is made that the two regions continuing in the vertical direction have the same color, whereby the weighing amount $w_{ij}$ of the corresponding region is reduced by half at step S107. The above mentioned C1, C2, and C3 are threshold values set to determine if the same color exists in adjacent regions.

Regarding 8 regions $A_{11}$–$A_{81}$ at the left end of the picture (FIG. 4), the determination procedure of the same color is unnecessary because regions further to the left side do not exist. If the region is determined as the leftmost region of the picture at step S108, the following steps S109–S111 are bypassed.

If determination is made that the region is not the leftmost region of the picture at step S108, determination is made whether the color evaluating value difference $|r_{ij} - r_{i\,(j-1)}|$ regarding color difference signal R-Y between the adjacent regions in the horizontal direction exceeds a predetermined value C1 or not at step S109. In a similar manner at step S110, determination is made whether the color evaluating value difference $|b_{ij} - b_{i\,(j-1)}|$ regarding color difference signal B-Y between the two adjacent regions in the horizontal direction exceeds a predetermined value C2 or not. At step S111, determination is made whether the luminance evaluating value difference $|Y_{ij} - Y_{i\,(j-1)}|$ between adjacent regions in the horizontal direction exceeds a predetermined value C3 or not. If none of the evaluated values exceed the corresponding predetermined values C1, C2, and C3, determination is made that the picture in any two adjacent regions in the horizontal direction contain the same color. Consequently, the weighing amount $w_{ij}$ of the corresponding region is reduced by half at step S112.

This process of determining the same color in the vertical direction and the horizontal direction is carried out for other regions in step S113. The weighing amount $w_{ij}$ of each region determined by same-color-processing circuit 27 is applied to picture evaluating circuit 28, whereby the color evaluating values of the entire picture regarding color difference signals R-Y and B-Y are calculated by picture evaluating circuit as picture color evaluating values $V_r$ and $V_b$, according to the following equations (1) and (2).

$$V_r = \sum_{i=1}^{8} \sum_{j=1}^{8} (r_{ij} \times w_{ij}) / \sum_{i=1}^{8} \sum_{j=1}^{8} w_{ij} \qquad (1)$$

$$V_b = \sum_{i=1}^{8} \sum_{j=1}^{8} (b_{ij} \times w_{ij}) / \sum_{i=1}^{8} \sum_{j=1}^{8} w_{ij} \qquad (2)$$

The above equations is explained briefly hereinafter. In equation (1), $$\sum_{i=1}^{8} \sum_{j=1}^{8} (r_{ij} \times w_{ij})$$

is the total sum of adding the multiplication result of all the 64 regions, upon multiplying the color evaluating value $r_{ij}$ of the 64 regions, by the corresponding weighing amount $w_{ij}$ to be weighted. The total sum is divided by $$\sum_{i=1}^{8} \sum_{j=1}^{8} w_{ij}$$

which is the total sum of the weighing amount of all the regions to carry out normalization by the weighing amount. By summation and multiplication of the color evaluating value $r_{ij}$ of the color difference signal over the entire picture using the weighing amount $w_{ij}$, a picture color evaluating value $V_r$ having area factors removed is derived. The above mentioned description of equation (1) is similarly applicable to equation (2).

Referring to FIG. 3, gain control circuits 29 and 30 control gains of R amplifying circuit 4 and B amplifying circuit 5, respectively, so that picture color evaluating values $V_r$ and $V_b$ which are the color evaluating values of the entire picture both become 0. When the picture color evaluating values $V_r$ and $V_b$ both become 0, white balance adjustment is completed.

In accordance with the above mentioned first embodiment, by reducing the contribution of the color information of regions of the same color towards white balance adjustment by a half in comparison with the contribution of the color information of other regions, the degree of effect of the same color object regarding the color evaluating values of the entire picture is reduced to suppress the offset of white balance to the complementary color of the color of the object to a minimum. White balance is achieved even when an object of the same color occupies a large area in the picture. This results in the reproduction of proper color tone of the object in the reproduced picture.

Although the reduced weighing amount is ½ in the above mentioned first embodiment, it is possible to set the value to an appropriate value such as ⅓, ¼.

Although the first embodiment is implemented so as to reduce the weighing amount of one region of the two regions continuing in the vertical or horizontal direction having the same color, it is possible to reduce the weighing amount of both regions.

Figure 7:
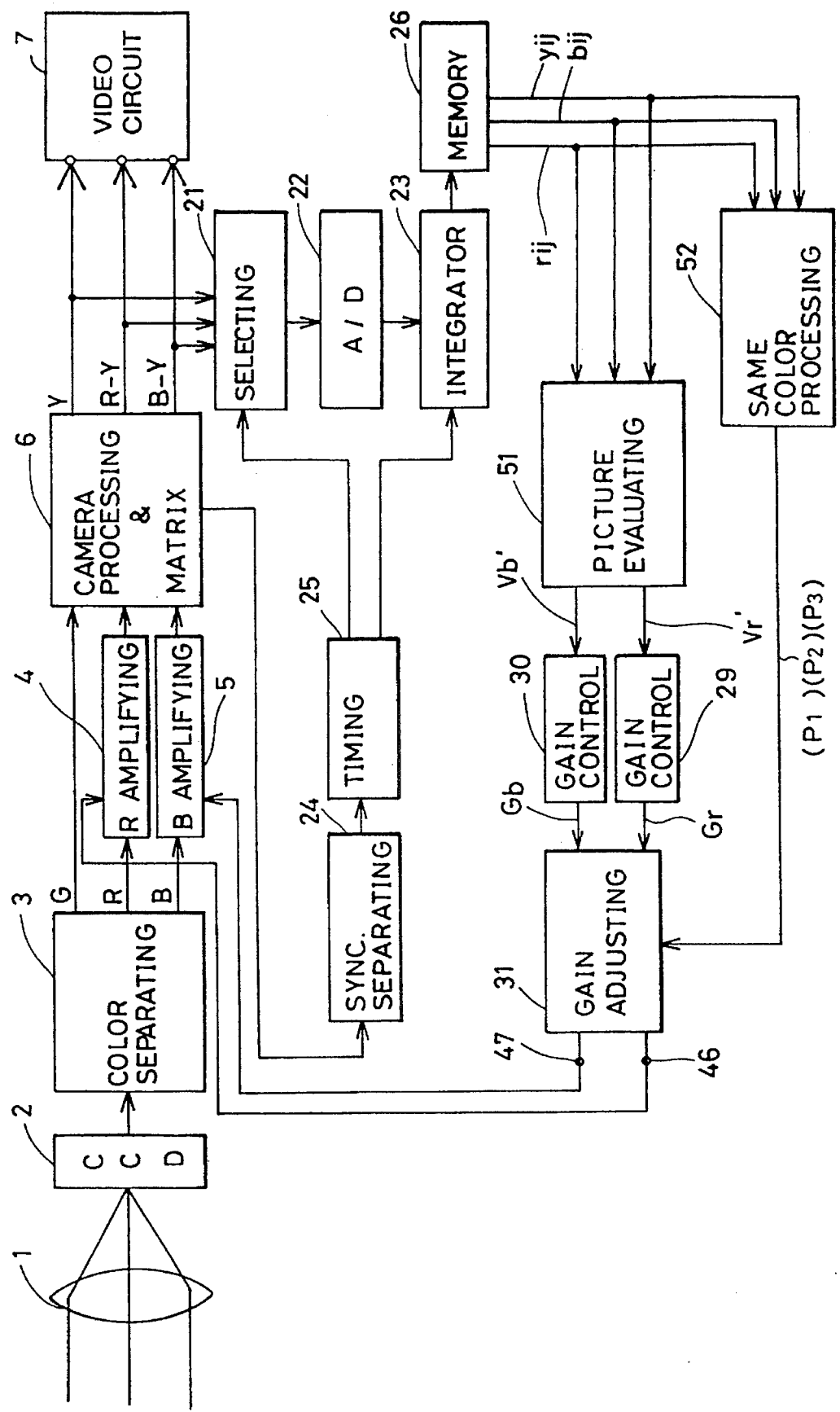
FIG. 7 is a block diagram showing a white balance adjusting apparatus of a second embodiment of the present invention.

FIG. 7 is a block diagram of a second embodiment of the present invention. The second embodiment of FIG. 7 is the same as the first embodiment of FIG. 3, except for the following points.

As explained in association with FIG. 3, the latest color evaluating values $r_{ij}$ and $b_{ij}$ of the latest evaluating values $y_{ij}$, $r_{ij}$, and $b_{ij}$ (i, j=1–8) held in memory 26 are applied to picture evaluating circuit 51. Picture evaluating circuit 51 derives the color evaluating values $V_r'$, $V_b'$ of the entire picture relating to respective color difference signals, according to the following equations (3) and (4).

$$v_r' = \sum_{i=1}^{8} \sum_{j=1}^{8} (r_{ij})/64 \qquad (3)$$

$$v_b' = \sum_{i=1}^{8} \sum_{j=1}^{8} (b_{ij})/64 \qquad (4)$$

According to the above equation (3), by dividing the total sum of color evaluating values $r_{ij}$ of each 64 regions by the total number of the regions, the average value of the color evaluating value regarding color difference signal R-Y of one region is derived as the picture color evaluating value. According to the above equation (4), by dividing the total sum of the color evaluating values $b_{ij}$ of 64 regions by the total number of the regions, the average value of the color evaluating value of color difference signal B-Y of one region is derived as the picture color evaluating value.

Gain control circuits 29 and 30 output gain control signals $G_r$ and $G_b$ so that picture color evaluating values $V_r'$ and $V_b'$ which are the color evaluating values of the entire picture both become 0 to adjust the variable gains of R amplifying circuit 4 and B amplifying circuit 5.

The latest evaluating value $y_{ij}$, $r_{ij}$, and $b_{ij}$ held in memory 26 are also provided to same-color-processing circuit 52. Same-color-processing circuit 52 differs from same-color-processing circuit 27 of FIG. 3 in that determination is made whether the regions continuing in the vertical or horizontal direction of the 64 regions are of the same color or not and the number of same color occurrences are counted.

Figure 8B:
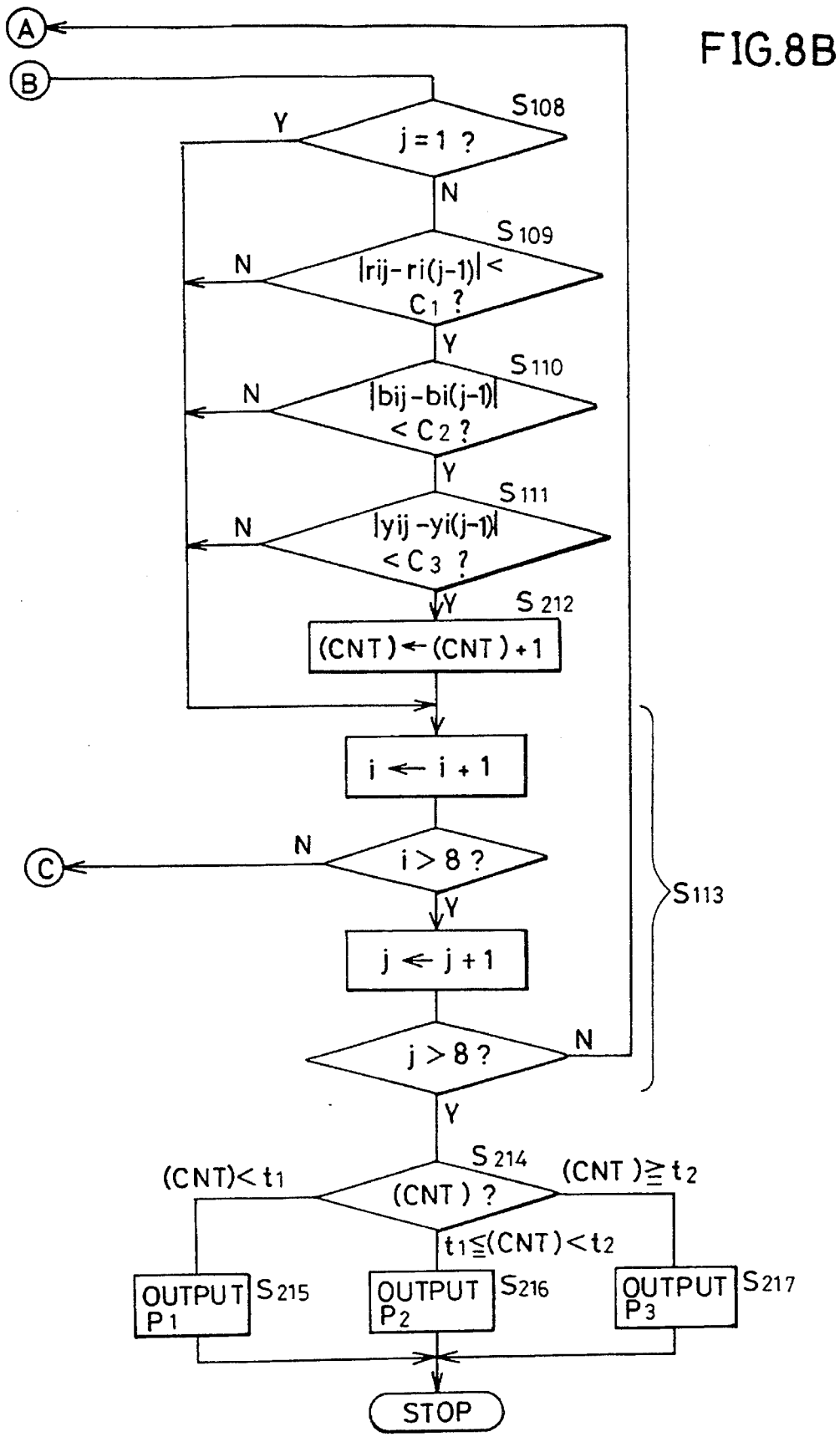

FIGS. 8A and 8B are flow charts for explaining the operation of same-color-processing circuit 52. Steps identical to those of the flow chart of FIG. 6 are indicated by identical reference numbers. With reference to the flow chart of the FIG. 8A, counter CNT (not shown) of same-color-processing circuit 52 is initialized at step S200 to set the count value of counter CNT to 0.

In steps S100 and S101, initialization for commencing the determination procedure starting at region $A_{11}$ is accomplished.

If the region is determined as not the topmost region of the picture at step S103, determination is made at step S104 whether the color evaluating value difference $|r_{ij}-r_{(i-1)j}|$ regarding color difference signal R-Y between adjacent regions in the vertical direction exceeds a predetermined value C1 or not. In a similar manner at step S105, determination is made whether the color evaluating value difference $|b_{ij}-b_{(i-1)j}|$ of color difference signal B-Y between adjacent regions in the vertical direction exceeds a predetermined value C2 or not. At step S106, determination is made whether luminance evaluating value difference $|y_{ij}-Y_{(i-1)j}|$ between adjacent regions in the vertical direction exceeds a predetermined value C3 or not. If the none of evaluated value differences exceed predetermined values C1, C2, and C3, determination is made that the picture in any two adjacent regions in the vertical direction contain the same color. Consequently, 1 is added to the count value of counter CNT at step S207. The above mentioned predetermined values C1, C2, and C3 are threshold values set so as to allow determination of the same color between adjacent regions, similar to the aforementioned first embodiment.

At step S108 of FIG. 8B, if determination is made that the region is not the leftmost region, determination is made whether color evaluating value difference $|r_{ij}-r_{i(j-1)}|$ regarding color difference signal R-Y between adjacent regions in the horizontal direction of the picture exceeds a predetermined value C1 or not. In a similar manner, determination is made whether the color evaluating value difference $|b_{ij}-b_{i(j-1)}|$ regarding color difference signal B-Y between adjacent regions in the horizontal direction exceeds a predetermined value C2 or not. At step S111, determination is made whether luminance evaluating value difference $|y_{ij}-y_{i(j-1)}|$ between adjacent regions in the horizontal direction exceeds a predetermined value C3 or not. If none of the evaluating value differences exceed the corresponding predetermined values C1, C2, and C3, determination is made that the picture in any two adjacent regions in the horizontal direction contain the same color. Consequently, 1 is added to the count value of the counter CNT at step S212.

This series of determination procedure of the same color in the vertical direction and the horizontal direction is carried out over the remaining regions at step S113. If the entire region is of the same color, the count value of counter CNT will become the maximum value of 7×8×2=112, for example. Because the count value of counter CNT is proportional to the area of the region having the same color, this count value may be used as a parameter for indicating the largeness of the area.

When the determination of the same color is carried out for all the regions, the count value of counter CNT is identified at step S214. Two threshold values $t_1$ and $t_2$ with the relation of $0 \leq t_1 \leq t_2 \leq 112$ are used in step S214. When the count value of counter CNT is less than $t_1$, a determination signal P1 is provided from same-color-processing circuit 52 as shown in step S215. When the count value of counter CNT is equal or greater than $t_1$ and less than $t_2$, determination signal P2 is provided from same-color-processing circuit 52 as shown in step S216. When the count value of counter CNT is equal or more than $t_2$, determination signal P3 is respectively provided from same-color-processing circuit 52 as shown in step S217. In accordance with the present embodiment, threshold values of $t_1$ and $t_2$ are set to $t_1=50$ and $t_2=90$ according to observation values obtained in advance by an experiment.

Referring to FIG. 7, determination signals P1, P2, and P3, and gain control signals $G_r$ and $G_b$ from gain control circuits 29 and 30 are applied to gain adjusting circuit 31. Gain adjusting circuit 31 is comprised of two switches 40 and 41, dividers 42 and 44, and prior value holding circuits 43 and 45, as shown in FIG. 9.

Figure 9:
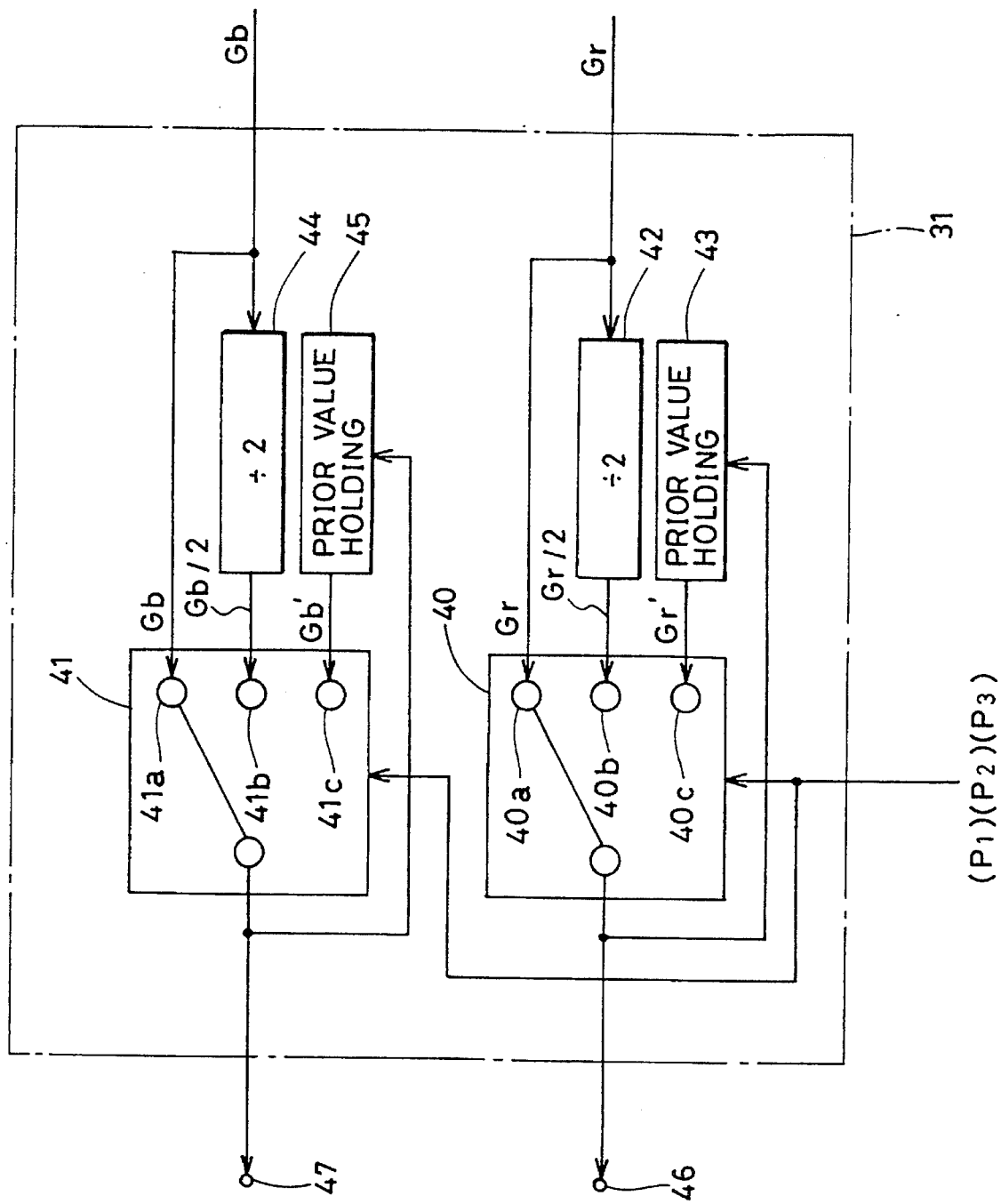
FIG. 9 is a block diagram showing the detail of the gain adjusting circuit of FIG. 7.

Referring to FIG. 9, dividers 42 and 44 function to reduce the respective levels of the gain control signals $G_r$ and $G_b$ by ½. Prior value holding circuits 43 and 45 function as to hold the outputs of 1 field previously provided from switch circuits 40 and 41 as $G_r'$ and $G_b'$.

Switches 40 and 41 function as to select any of fixed contacts 40a and 41a to which gain control signals $G_r$ and $G_b$ are applied respectively, fixed contacts 40b and 41b to which the output of dividers 42 and 44 are applied respectively, and fixed contacts 4oc and 41c to which the outputs of prior value holding circuits 43 and 45 are applied respectively.

The switching of switches 40 and 41 are controlled by determination signals P1, P2, and P3 obtained from same-color-processing circuit 52. More specifically, when determination signal P1 is provided, switches 40 and 41 are turned to the sides of fixed contacts 40a and 41a, whereby gain control signals $G_r$ and $G_b$ are directly provided to output terminals 46 and 47 respectively. When determination signal P2 is provided, switches 40 and 41 are turned to the sides of fixed contacts 40b and 41b, whereby the gain control signals $G_r$ and $G_b$ by attenuated ½ are provided to output terminals 46 and 47 respectively. When determination signal P3 is provided, switches 40 and 41 are turned to the sides of fixed contacts 40c and 41c, whereby the prior gain control signals $G_r'$ and $G_b'$ stored in prior value holding circuits 43 and 45 are provided to output terminals 46 and 47 respectively. The gain control signals provided to output terminals 46 and 47 from switches 40 and 41 are also applied to and held in prior value holding circuits 43 and 45.

The operation of same-color-processing circuit 52 and gain adjusting circuit 31 will be described with reference to FIGS. 10, 11 and 12.

Figure 10:
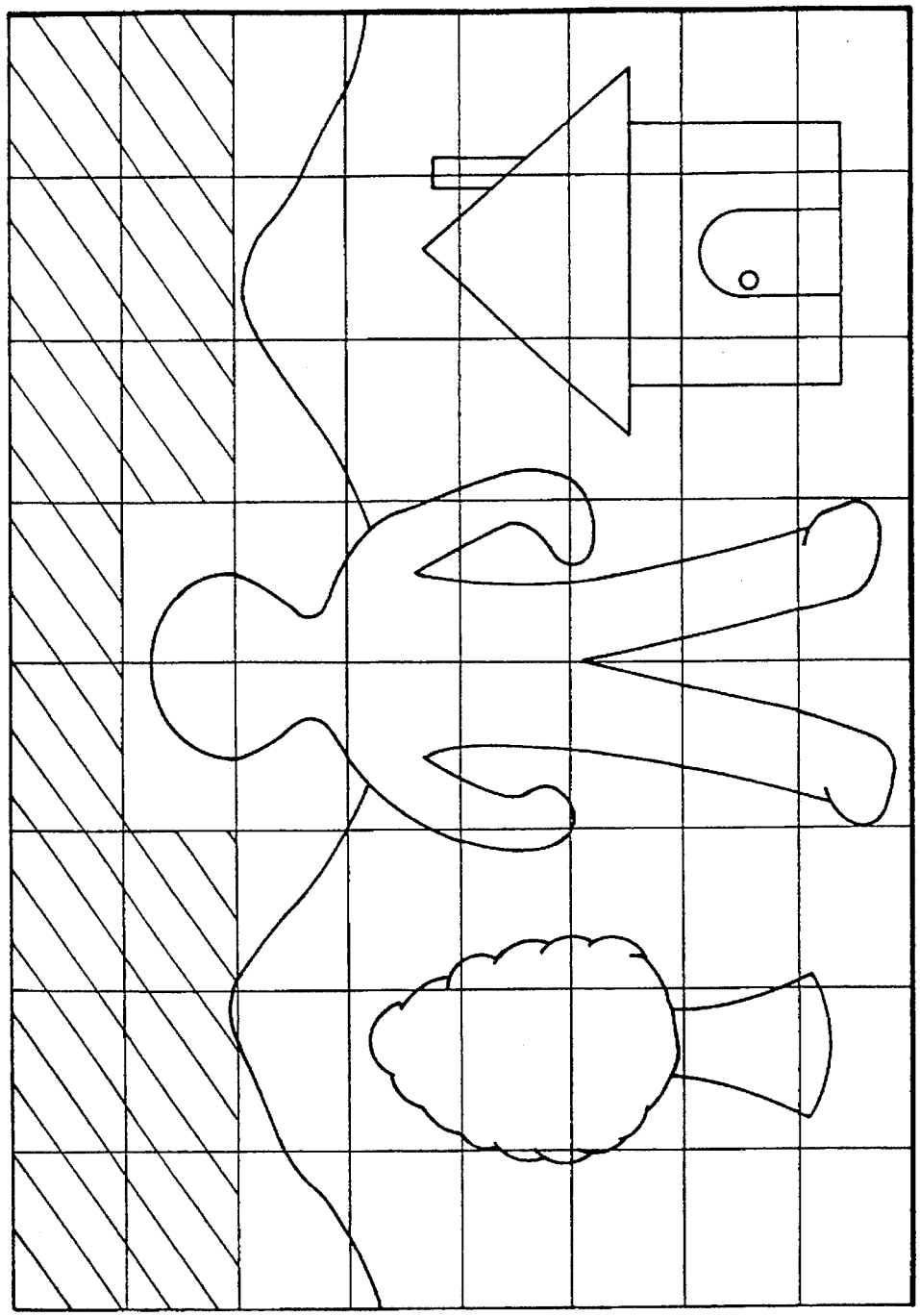
FIGS. 10, 11, and 12 are schematic diagram for explaining the operation principle of the second embodiment of FIG. 7.

In taking a scene having various objects as shown in FIG. 10, the regions determined as having the same color by same-color-processing circuit 52 is the portion of the sky indicated by the hatched area. At this time, the value of counter CNT of same-color-processing circuit 52, that is to say, the number of adjacent regions in both the vertical and horizontal directions having the same-color is 17. Because this value of 17 is less than $t_1$, determination signal P1 is provided. Gain adjusting circuit 31 receives this determination signal P1 to turn switches 40 and 41 to the sides of fixed contacts 40a and 41a respectively. This results in gain control signals $G_r$ and $G_b$ directly provided from gain adjusting circuit 31, whereby R amplifying circuit 4 and B amplifying circuit 5 have their gains controlled by these gain control signals to adjust white balance properly.

Figure 11:
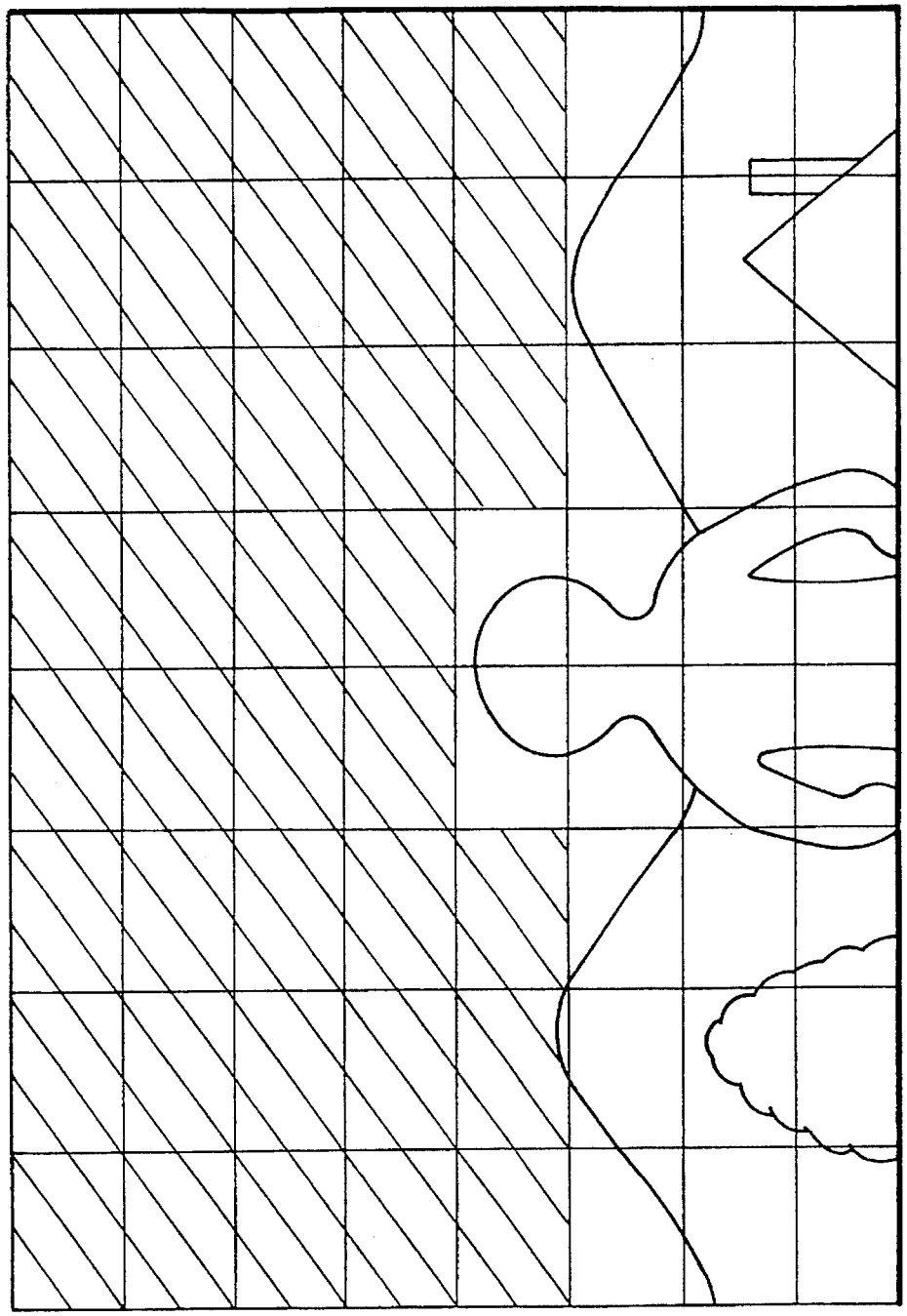

Assume that the video camera is tilted upward so that the picture changes as shown in FIG. 11. The region area of the blue sky determined as the same color by same-color-processing circuit 52 increases as shown by the hatched area, whereby the count value of counter CNT becomes 62. This value of 62 which is equal or greater than $t_1$ and less than $t_2$ causes determination signal P2 to be provided from same-color-processing circuit 52. Gain adjusting circuit. 31 is responsive to P2 to turn switches 40 and 41 to the sides of fixed contacts 40b and 41b. By control signals attenuating gain control signals $G_r$ and $G_b$ by ½, white balance adjustment is carried out. Each changing rate of R amplifying circuit 4 and B amplifying circuit 5 is half of that of the normal situation shown in FIG. 10.

Figure 12:
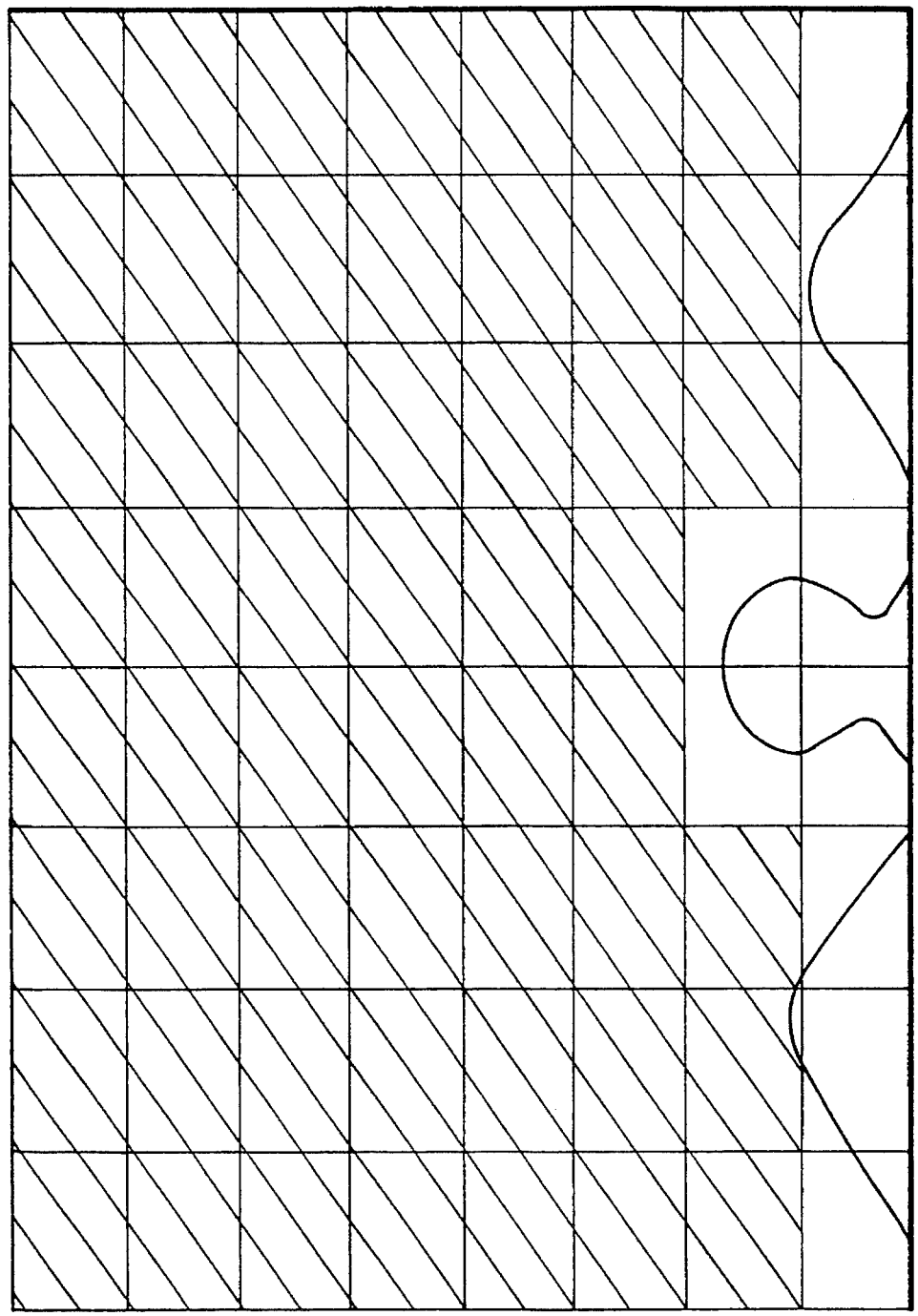

Further tilting the video camera upwards, the picture changes to that as shown in FIG. 12. The area of the blue sky determined as the same color by same-color-processing circuit 52 further increases as shown by the hathced area in the figure. The count value of counter CNT becomes 92, which is a value equal or greater than $t_2$. As a result, determination signal P3 is provided from same-color-processing circuit 52. Gain adjusting circuit 31 receives this determination signal P3 to turn switches 40 and 41 to the sides of fixed contacts 40c and 41c. White balance is adjusted by the prior gain control signals $G_r'$ and $G_b'$ held in prior value holding circuits 43 and 45. This means that when the area of the same color occupies a very large area as shown in FIG. 12, the color information of the current image sensed picture is not employed as the base of the evaluation of white balance adjustment, and the gains of R and B signals are controlled according to the color information of the prior field picture.

In accordance with the second embodiment of the present invention, the gain control rate is varied in steps according to the size of the area occupied by the same color objects in the image sensed picture. When an extremely large area of the picture is occupied by an object of the same color, the offset of white balance intense in the side of the complementary color of the object's color is suppressed to a minimum because the color information of the current picture is not used for white balance adjustment.

Although the number of determinations of the same color region is divided into 3 steps of less than $t_1$, more than or equal to $t_1$ and less than $t_2$, and more than or equal to $t_2$ in the above mentioned second embodiment, it is possible to vary the gain control rate in more steps by providing more determination steps.

In the above first and second embodiments, fixed reference values C1, C2, and C3 are used for determining the magnitude of the color evaluating value difference or the luminance evaluating value difference (amount of fluctuation) between continuing regions. However, when the zoom lens is at the wide angle side with short focal length, or when there is significant distance between the object and the image sensing apparatus, various objects will enter the picture. This means that the evaluating values of each region as the average of the color distribution of these objects are less likely to differ. There is a possibility that the weighing amount is reduced or the gain control signals are attenuated unnecessarily because of erroneous determination of the same color between adjacent regions even though multiple colors are included in each region. This may result in the reduction of white balance adjustment accuracy.

Regarding regions having large or small absolute values of the evaluating value, the amount of fluctuation of the evaluating value when the evaluating values vary at the same rate between adjacent regions is greater in regions with a large absolute value of the evaluating value. In such regions of high chroma, determination of the same color is less likely to be made. Conversely, in regions of substantially achromatic color where the absolute value of the evaluating value is low, determination of the same color is more likely to be made. In order to improve the accuracy of white balance adjustment, contribution towards the control of white balance adjustment of high chroma color regions where the absolute value of the evaluating value is high should be removed. While contribution towards the control of white balance adjustment of substantially achromatic color regions, where the absolute value of the evaluating value is low, should be increased.

Figure 13:
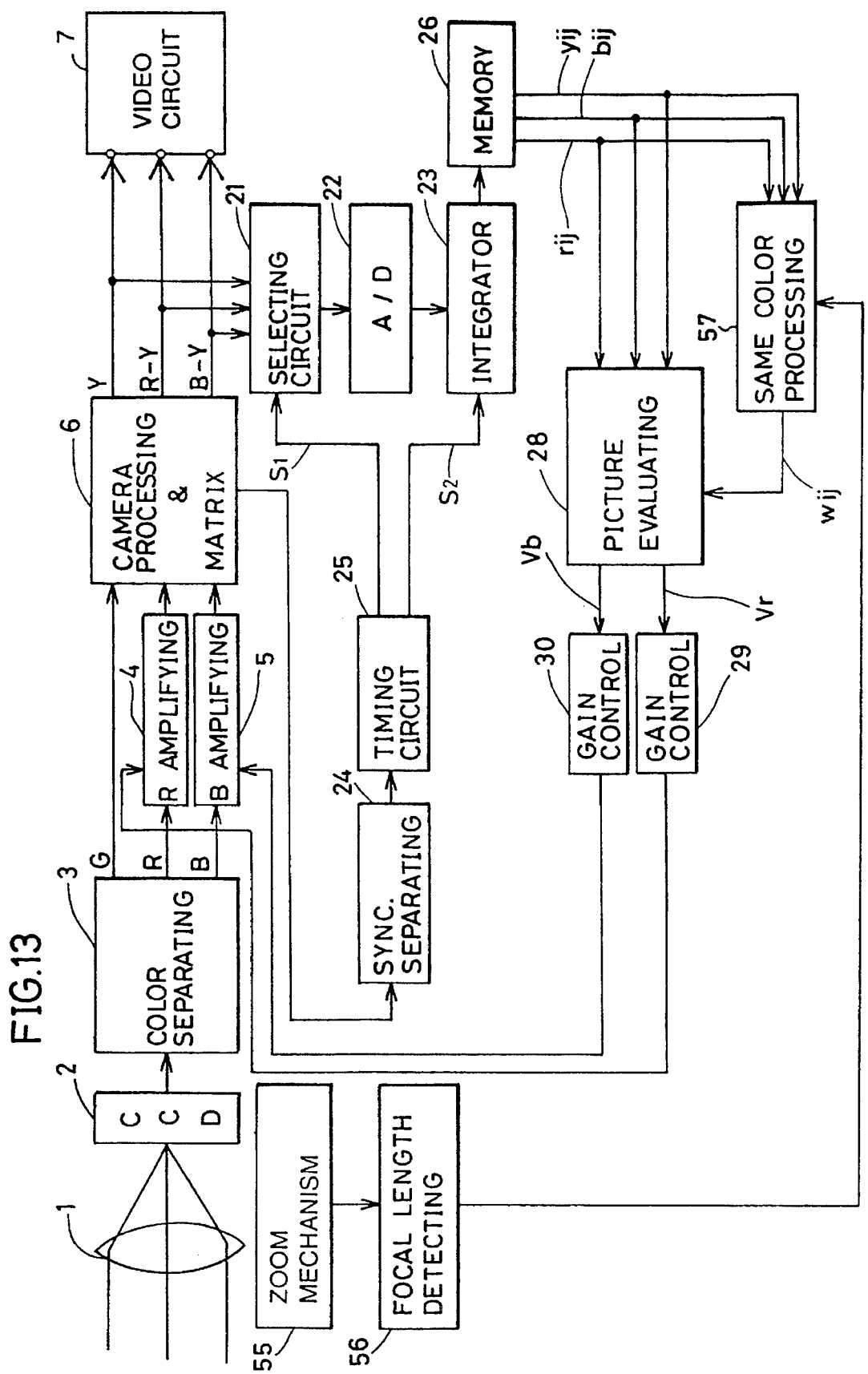
FIG. 13 is a block diagram showing a white balance adjusting apparatus of a third embodiment of the present invention.

FIG. 13 is a block diagram showing an automatic white balance adjusting apparatus of the third embodiment of the present invention proposed to solve the above mentioned problem. The third embodiment of FIG. 13 is identical to the first embodiment of FIG. 3, except for the following points.

Referring to FIG. 13, a well-known zoom mechanism 55 is provided. It is possible to alter the focal length of the lens system of the entire camera from a wide angle zoom region to telephoto zoom region if necessary by displacing the zoom lens (not shown) which implements zoom mechanism 55.

A focal length detecting circuit 56 detects the position of the zoom lens to calculate the focal length f of the lens system. This position is provided as the lens focal length information.

The same-color-processing circuit 57 functions so as to reduce the weighing amount of the corresponding region when regions of the same color exist in continuation, similarly to same-color-processing circuit 27 of the first embodiment of FIG. 3. The operation of the same-color-processing circuit 57 of FIG. 13 differs from the operation of same-color-processing circuit 27 of the first embodiment of FIG. 6 in that an additional reference value modify routine is added for changing the reference values C1, C2, and C3 used for determining the weighing amount, according to the lens focal length information provided from focal length detecting circuit 56. This is shown in step S220 of the flow chart of FIG. 14.

Figure 14:
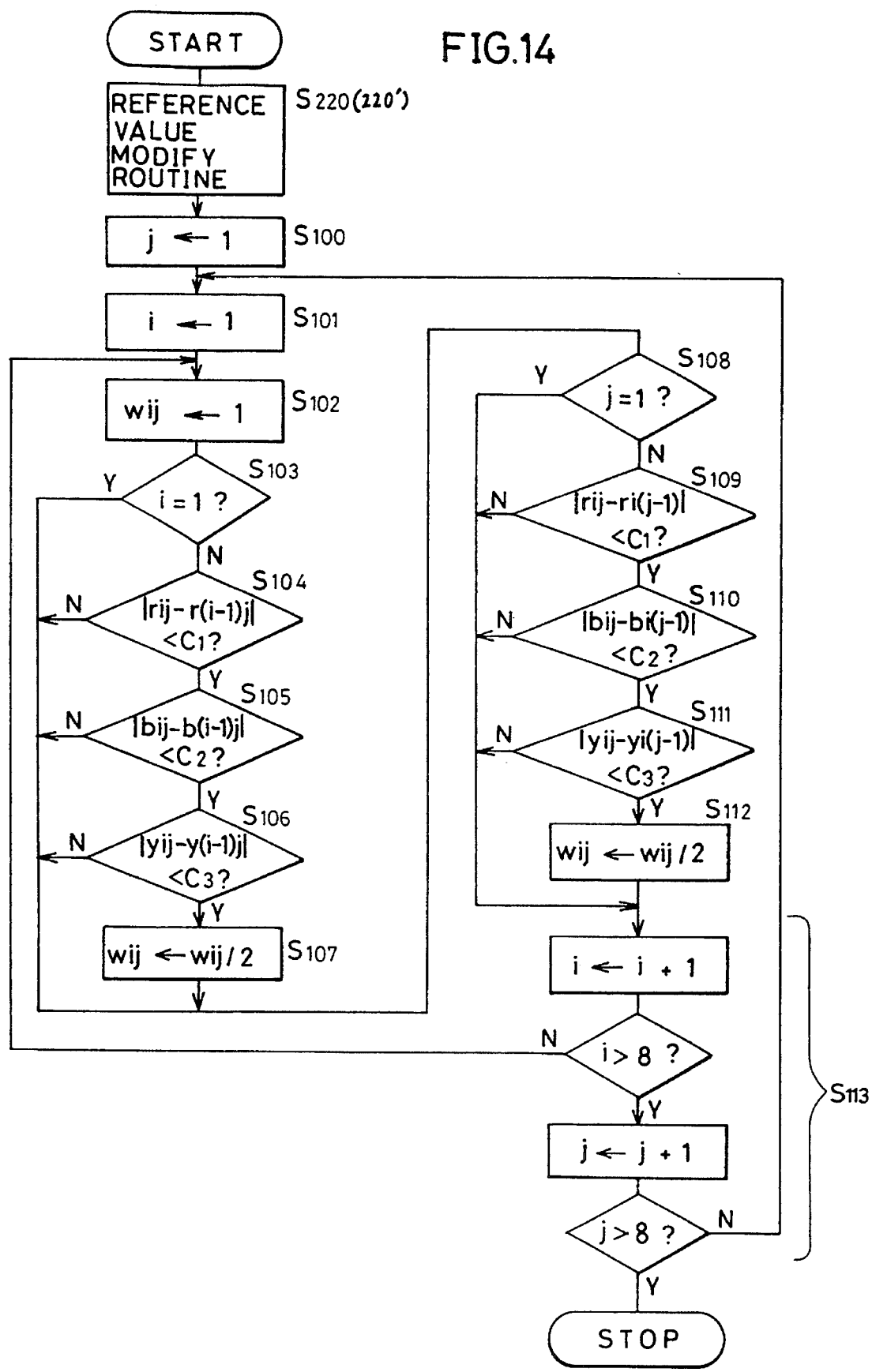
FIG. 14 is a flow chart for explaining the operation of the third embodiment of FIG. 13.
Figure 15:
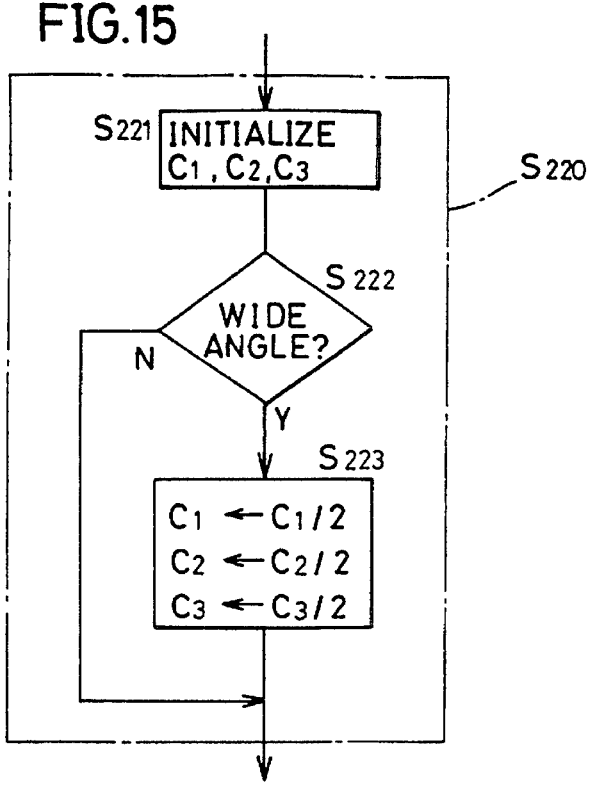
FIG. 15 is a flow chart for showing the reference value modify routine of the flow chart of FIG. 14.

FIG. 15 is a flow chart showing the reference value modify routine S220 of FIG. 14. Referring to FIG. 15, determination is made whether focal length f is shorter than a predetermined reference focal length $f_0$ or not. That is to say, whether the zoom lens is at the side of the wide angle or not, at step S222 after the reference values C1, C2 and C3 are initialized in step S221. If determination is made that the zoom lens is at a wide angle setting, reference values C1, C2, and C3 are all reduced by ½ at step S223. If focal length f is longer than reference focal length $f_0$, i.e., if determination is made that the zoom lens is at a telephoto setting, reference values C1, C2, and C3 are not changed.

Using reference values C1, C2, and C3 obtained in the above manner, similar operations as in the first embodiment of FIGS. 3 and 6 are carried out. Reference values C1, C2, and C3 are all reduced when a wide angle region is set where colors are less likely to be offset due to various objects included in each region, in comparison with telephoto regions where color distribution of the picture is apt to be intense in a certain color due to a certain object occupying a large area in the picture. Therefore, in the same color determination operation of steps S104–S106 or steps S109–S111 of FIG. 14, determination of adjacent regions having the same color is less likely to be made as long as the amount of fluctuation of the color evaluating values are not significantly small.

FIG. 16 is a block diagram showing a fourth embodiment of the present invention. Referring to FIG. 16, a well-known focus mechanism 66 is provided for measuring the distance from the image sensing apparatus to the object using infrared, and moving lens 1 backward or forward in the optical axis direction according to the measured object distance to achieve the in-focus state. The information regarding object distance L obtained by focus mechanism 66 is provided to a same-color-processing circuit 67 to be used for same color determination procedure, as will be described afterwards.

Figure 17:
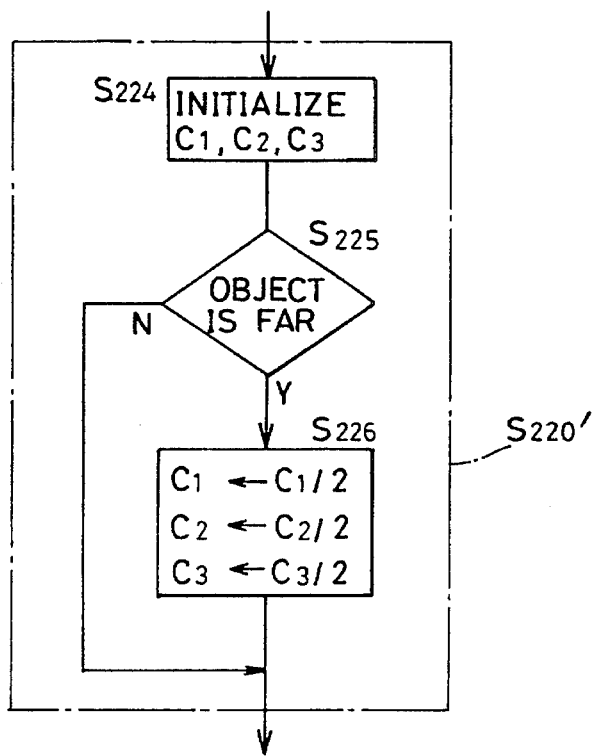
FIG. 17 is a flow chart for showing the reference value modify routine of the fourth embodiment of FIG. 16.

Same-color-processing circuit 67 basically carries out the operation of the flow chart of FIG. 14, similar as the third embodiment of FIG. 13. In this fourth embodiment, another reference value modify routine S220' is executed instead of the aforementioned reference value modify routine S220. Step S220' modifies reference values C1, C2, and C3 used for determining the weighing amount, according to the object distance, as shown in FIG. 17.

When the object is at a position far from the image sensing apparatus, the actual area of the object included in each area of the picture is increased, where various objects enter each region in the picture. Therefore, determination is made whether object distance L is greater than a predetermined reference object distance $L_0$ or not, at step S225, after the reference values C1, C2 and C3 are initialized in step S224. Note that differences of color difference signals and the luminance signal between adjacent regions are likely to be a small value. When object distance L is greater than reference object distance $L_0$, i.e. when the apparatus determines that the object is at a position far from the image sensing apparatus, reference values C1, C2, and C3 are reduced by ½ at step S226, as in the third embodiment of the FIG. 15. Then, the above mentioned same color determination operation of FIG. 14 is carried out. As a result, erroneous determination of the same color is prevented when the object is at a far location because determination of the same color in adjacent regions is less likely to be made.

The distance measuring system using infrared implemented as the focus mechanism 66 in the fourth embodiment of FIG. 16 is by way of example only, and any system may be used that moves lens 1 forward or backward so that the high frequency components extracted from the luminance signal are at a maximum. In such a case, the object distance should be associated with the position of the focus lens with respect to the CCD.

Figure 18:
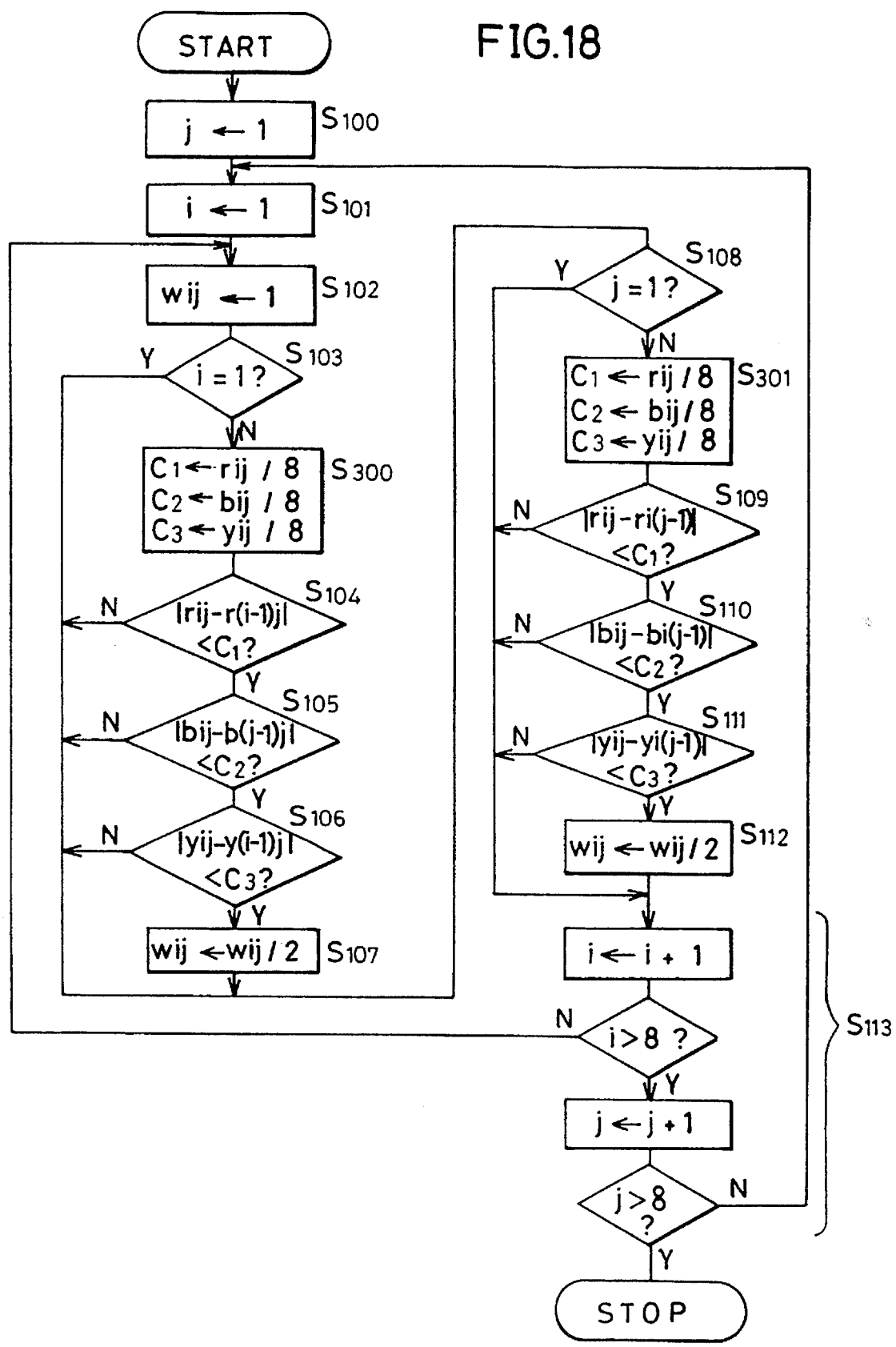
FIG. 18 is a flow chart for explaining the operation of a fifth embodiment of the present invention.

FIG. 18 is a flow chart showing the operation of the fifth embodiment of the present invention. The difference in operation from that of the first embodiment of FIG. 6 is that steps S300 and S301 are added. In the fifth embodiment, reference values C1, C2, and C3 are not set to predetermined values in advance, but are calculated from the absolute value of their respective evaluating values. More specifically, ⅛ of the evaluating value at each time point is used as reference values C1, C2, and C3 regarding the corresponding region at steps S300 and S301. In other words, C1=$r_{ij}$/8, C2=$b_{ij}$/8, and C3=$y_{ij}$/8. As a result, adjacent regions having evaluating values changing at a ratio greater than a predetermined ratio are not regarded as regions having the same color. This prevents the absolute value of each evaluating value from affecting the same color determination procedure.

Figure 19:
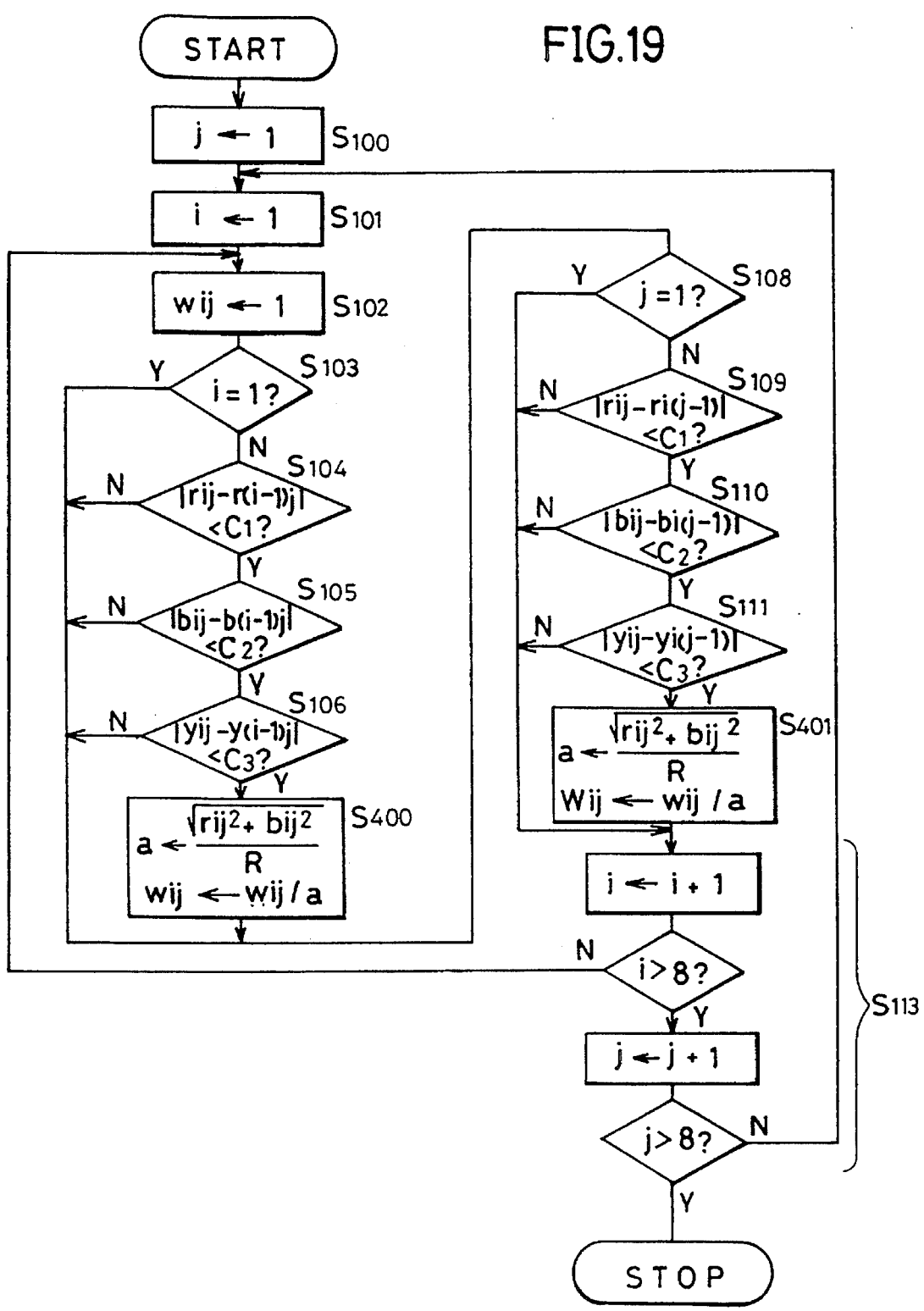
FIG. 19 is a flow chart for explaining the operation of a sixth embodiment of the present invention.

FIG. 19 is a flow chart showing the operation of a sixth embodiment of the present invention. The difference in operation from the first embodiment of FIG. 6 is that steps S400 and S401 are added instead of step S107 and S112. In the sixth embodiment, the reduced amount of the weighing amount is variable according to the absolute value of the evaluating value. The absolute value of the color evaluating value is expressed by a square root of the sum of each square of color evaluating values $r_{ij}$ and $b_{ij}$, i.e., the distance from white (origin point) on the color plane of FIG. 2.

More specifically, the following values are calculated using equations (5) and (6) at steps S400 and S401.

$$a = \sqrt{(r_{ij})^2 + (b_{ij})^2/R} \tag{5}$$

$$w_{ij} = w_{ij}/a \tag{6}$$

(R is a constant set in advance according to an observation value).

Regarding the regions determined as the same color at steps S104–S106 and steps S109–S111, the distance of the color determined as the same color from achromatic color is calculated as a in equation (5). Then by equation (6), the weighing amount $w_{ij}$ is varied inversely with a. This greatly reduces the weighing amount of the region of high chroma far from white to prevent the contribution of low chroma portions near white towards white balance adjustment from being reduced. It is possible to suppress the reduction of contribution towards white balance adjustment when the value of a is less than a predetermined value.

According to the above mentioned third to sixth embodiments, regions including color information effective in white balance adjustment are selected appropriately to achieve proper white balance adjustment, by altering the reference values used for the magnitude determination of the color evaluating values and the luminance evaluating value, or by altering the reduction amount of contribution towards white balance adjustment, according to the focal length of the lens, the distance between the object and the image sensing apparatus, the absolute value of the color signal information, and the like.

Figure 20:
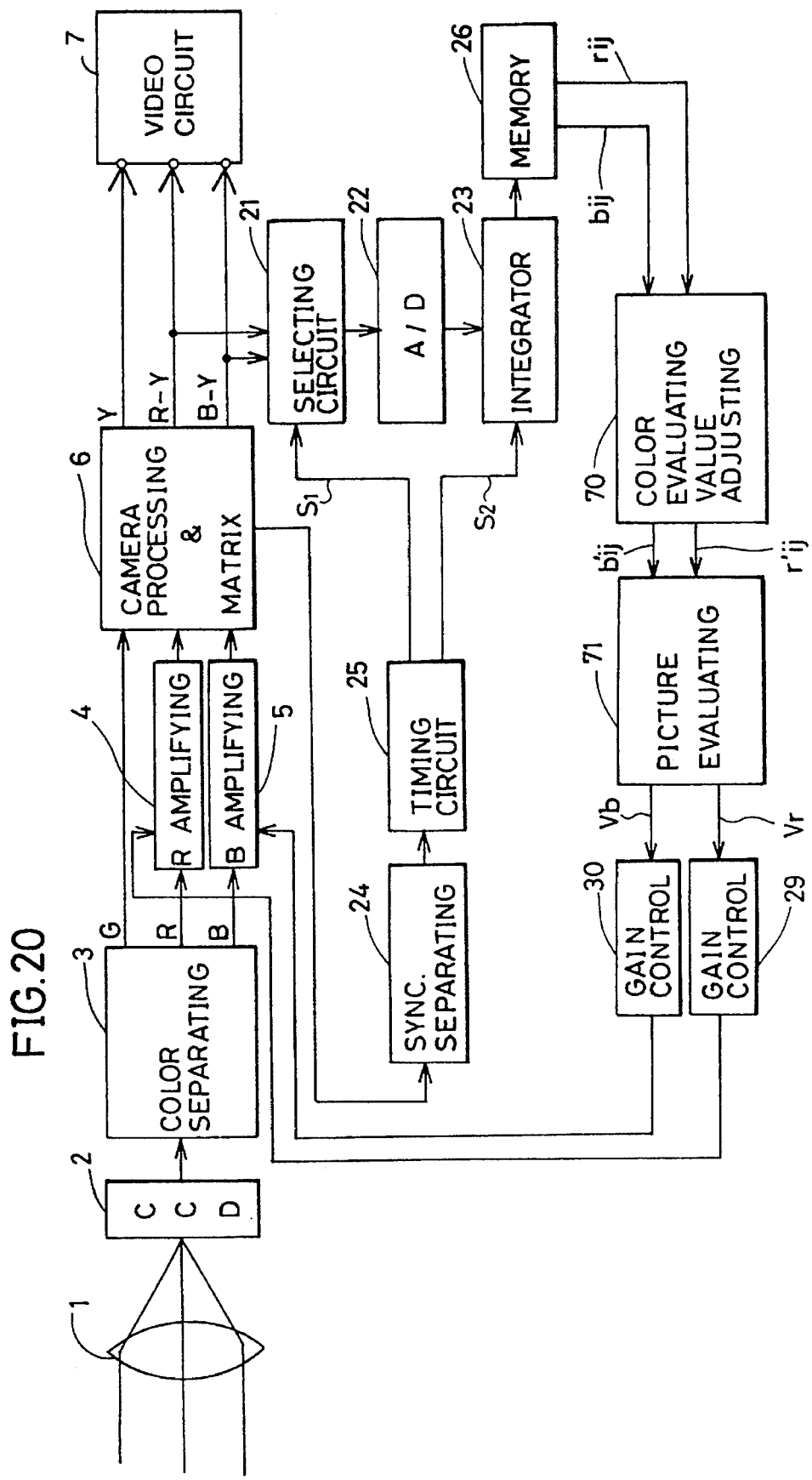
FIG. 20 is a block diagram of a white balance adjusting apparatus of a seventh embodiment of the present invention.

FIG. 20 is a block diagram showing an automatic white balance adjusting apparatus of a seventh embodiment of the present invention. The seventh embodiment of FIG. 20 is the same as the first embodiment of FIG. 3 except for the following points.

Only the two color difference signals R-Y and B-Y of the three signals provided from camera processing and matrix circuit 6 are provided to selecting circuit 21.

Selecting circuit 21 is responsive to selecting signal S1 from timing circuit 25 to alternately select either color difference signals R-Y or B-Y for every 1 field. This output is provided to the succeeding stage A/D converter 22 for each field in the order of (R-Y)→(B-Y)→(R-Y)→ . . . .

A/D converter 22 samples signals R-Y or B-Y selected by selecting circuit 21 with a predetermined sampling period and converts this into a digital value. This value is provided to integrator 23.

Integrator 23 receives switching signal S2 from timing circuit 25 to add the A/D converted values output from selecting circuit 21 over 1 field period for each region. That is to say, the output of selecting circuit 21 is digital-integrated for each of the 64 regions. The digital integrated value of each region is held in memory 26 as the color evaluating value, when integration over 1 field period is completed. As a result, the digital integrated values of respective regions of the color difference signal R-Y are obtained as 64 color evaluating values $r_{ij}$ (i=1–8, j=1–8) corresponding to the 64 regions in an arbitrary field. In the next field, the color difference signal B-Y is selected by selecting circuit 21. As a result of integration for each region by integrator 23, the digital integrated values for respective regions of color difference signal B-Y are obtained as 64 color evaluating values $b_{ij}$.

When integration over two field periods of the color difference signals R-Y and B-Y is completed, a total of 64×2=128 color evaluating values $r_{ij}$ and $b_{ij}$ are held in memory 26. Similar operations are repeated, whereby a new color evaluating value $r_{ij}$ at the next field, and a new color evaluating value $b_{ij}$ at a further next field are applied to memory 26 to update sequentially each color evaluating value.

The color evaluating values $r_{ij}$ and $b_{ij}$ held in memory 26 are provided to color evaluating value adjusting circuit 70. Color evaluating value adjusting circuit 70 determines whether there is a significantly high chroma object in the picture, using the color evaluating values for this determination. When there is a high chroma object, color evaluating value adjusting circuit 70 functions to reduce the effect of the color evaluating values regarding that object towards the white balance adjustment of the entire picture.

Figure 21:
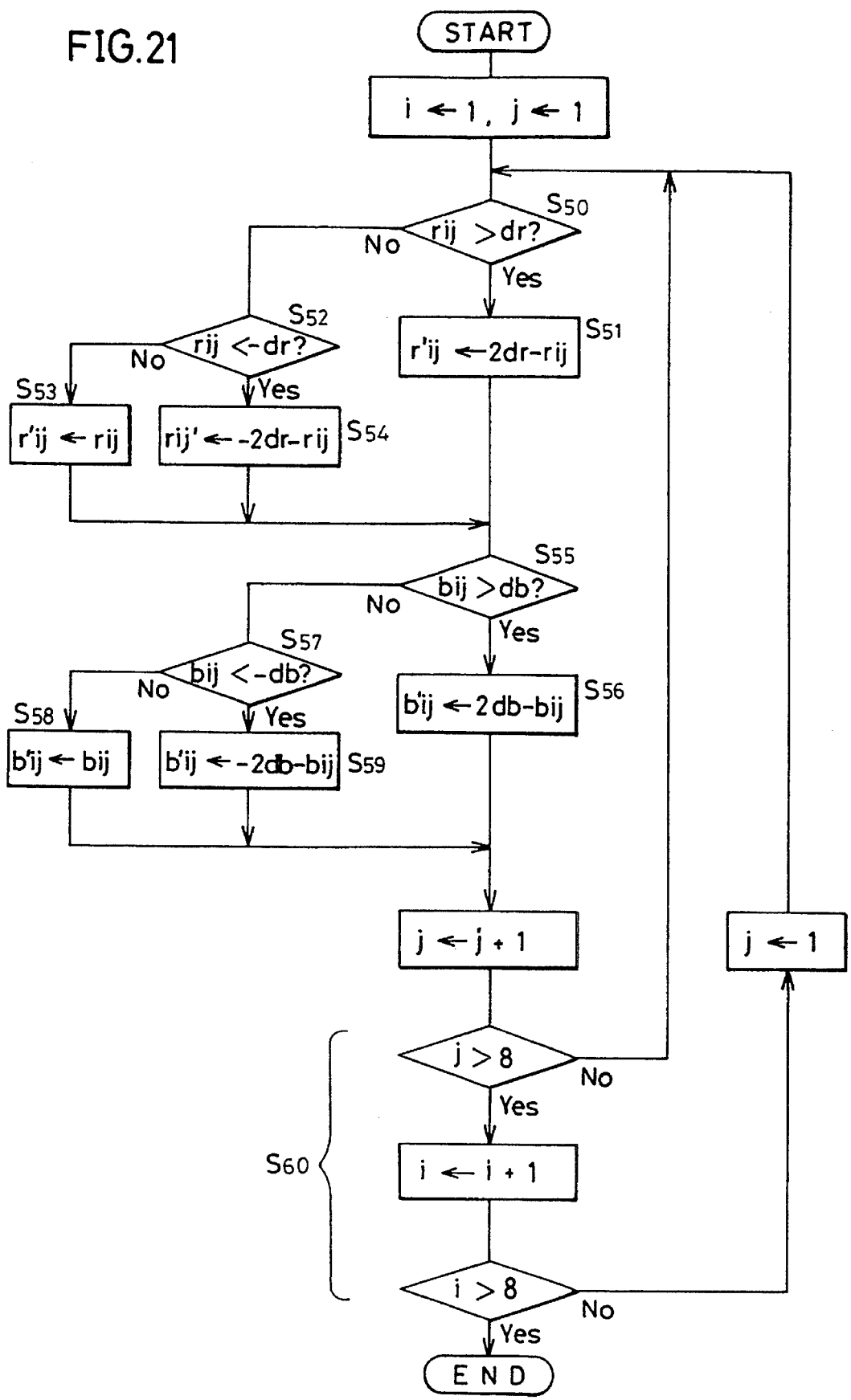
FIG. 21 is a flow chart for explaining the operation of the seventh embodiment of the present invention of FIG.

FIG. 21 is a flow chart for explaining the operation of color evaluating value adjusting circuit 70.

In the flow chart of FIG. 21, steps S50–S54 adjust (modify) color evaluating value $r_{ij}$ according to whether the absolute value $|r_{ij}|$ of color evaluating value $r_{ij}$ is less than or equal to R threshold value dr. That is to say, at step S50, when color evaluating value $r_{ij}$ of a certain region is greater than R threshold value dr, determination is made that a high chroma object regarding red components exists in the region and modifies the color evaluating value of this region to a new color evaluating value $r'_{ij}$ at step S51. Between color evaluating value $r'_{ij}$ and color evaluating value $r_{ij}$ not yet modified, there is the following relation:

$$r'_{ij}=2dr-r_{ij} \tag{7}$$

At step S52, the inventive apparatus determines that a high chroma object exist also in the case where color evaluating value $r_{ij}$ of a certain region is smaller than −dr, whereby the color evaluating value $r_{ij}$ of this region is modified to a new color evaluating value $r'_{ij}$ at step S54. Between this color evaluating value $r'_{ij}$ and color evaluating value $r_{ij}$ not yet modified, there is the following relation:

$$r'_{ij}=-2dr-r_{ij} \tag{8}$$

When the apparatus determines at steps S50 and S52 that the relation of $-dr \leq r_{ij} \leq dr$ is satisfied, the color evaluating value is not modified and output as:

$$r'_{ij}=r_{ij} \tag{9}$$

Similarly, at steps S55 and S59, color evaluating value $b_{ij}$ is modified according to whether the absolute value $|b_{ij}|$ of color evaluating value $b_{ij}$ is less than B threshold value db. According to each condition, color evaluating value $b_{ij}$ is modified to a new color evaluating value $b'_{ij}$.

When $b_{ij} > db$ $$b'_{ij} = 2db - b_{ij} \tag{10}$$

When $b_{ij} < -db$ $$b'_{ij} = -2db - b_{ij} \tag{11}$$

When $-db \leq b_{ij} \leq db$ $$b'_{ij} = b_{ij} \tag{12}$$

Figure 22A:
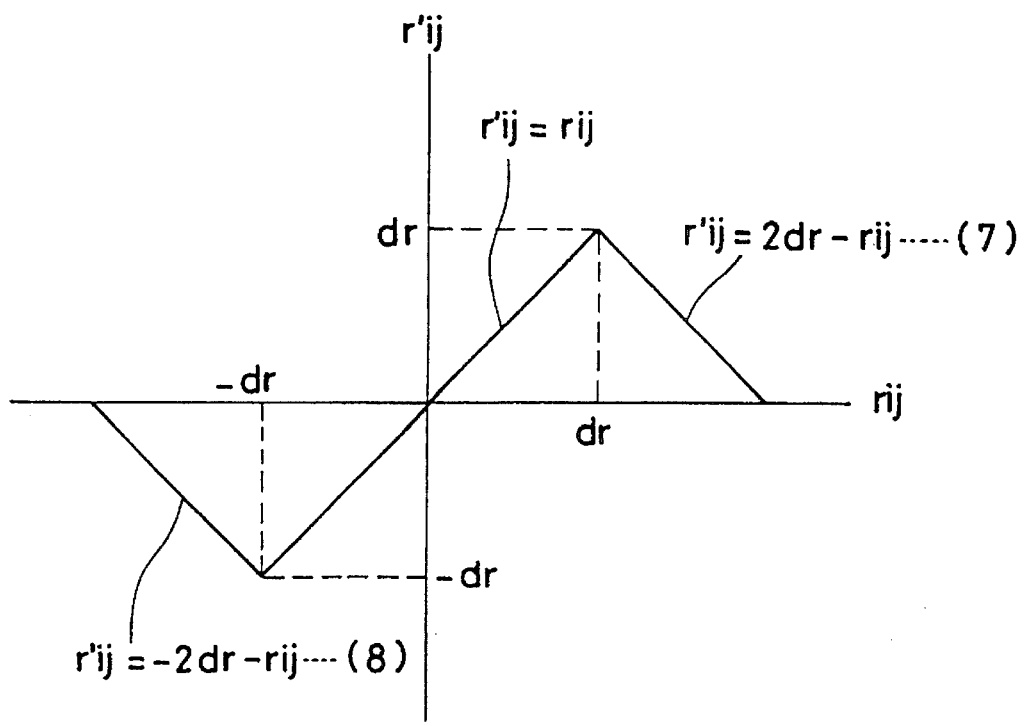
FIGS. 22A and 22B are graphs for explaining the operation principle of the seventh embodiment of FIG. 20.
Figure 22B:
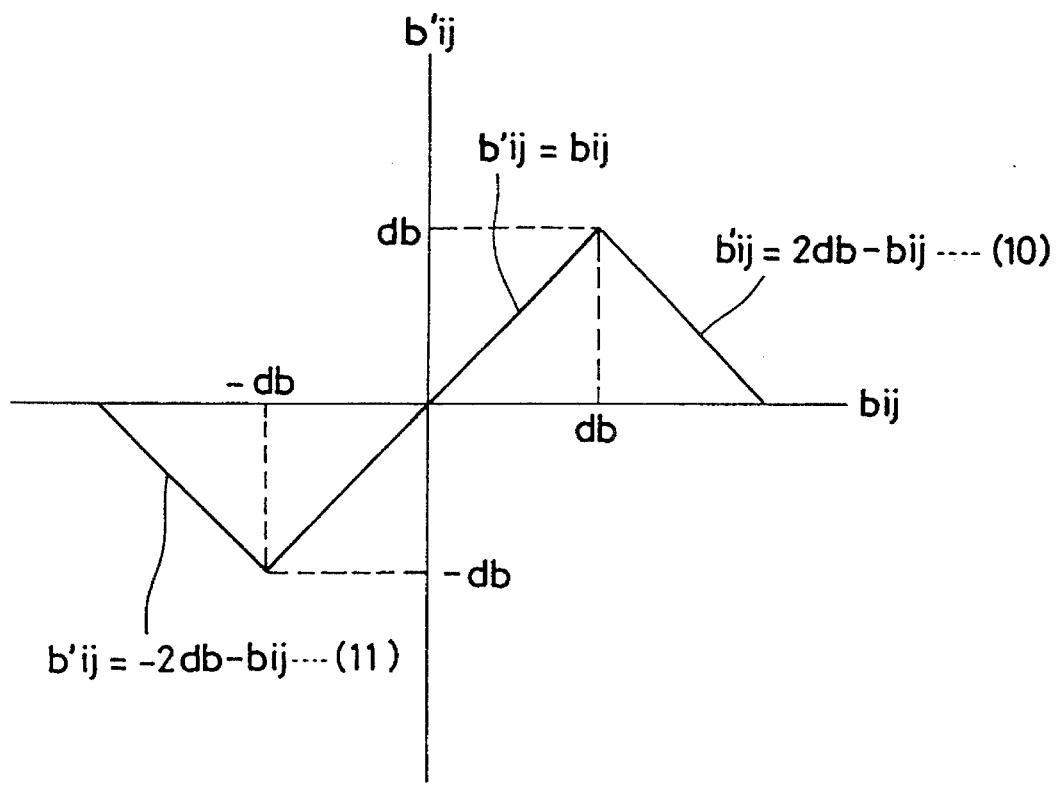

FIG. 22A is a graph showing the lines expressed by the above mentioned equations (7)–(9), with the color evaluating value $r_{ij}$ applied to color evaluating value adjusting circuit 70 as the abscissa, and the modified new color evaluating value $r'_{ij}$ as the ordinate. FIG. 22B is a graph showing the lines expressed by equations (10)–(12), with the color evaluating value $b_{ij}$ applied to color evaluating values adjusting circuit 70 as the abscissa, and the modified new color evaluating value $b'_{ij}$ as the ordinate.

In the case where a significant high chroma object exists in the region where each color evaluating value is extremely great, as shown in equation (7) of FIG. 22A and equation (10) of FIG. 22B, each color evaluating value is reduced monotonically to reduce the effect of the color evaluating values of the corresponding region towards white balance adjustment of the entire picture.

In the case where each color evaluating value is extremely small with a significantly high chroma subject existing in the region, as in equation (8) of FIG. 22A and equation (11) of FIG. 22B, each color evaluating value is reduced monotonously to reduce the effect of the color evaluating value of the corresponding region towards white balance adjustment of the entire picture.

At step S60 of FIG. 21, the above mentioned adjusting process of the color evaluating values is carried out sequentially for each of the 64 regions.

R threshold value dr and B threshold value db are set according to observation values in advance where it is presumed that these color evaluating values have inferior effect on white balance adjustment, if the conditions of $-dr \leq r_{ij} \leq dr$, $-db \leq b_{ij} \leq db$ are not satisfied.

The new color evaluating values $r'_{ij}$ and $b'_{ij}$ obtained by the above manner are provided to picture evaluating circuit 71, where the color evaluating values, of the entire picture regarding respective color difference signals are calculated as picture color evaluating values $V_r$ and $V_b$ according to the following equations (13) and (14).

$$V_r = \sum_{i=1}^{8} \sum_{j=1}^{8} r'_{ij}/64 \tag{13}$$

$$V_b = \sum_{i=1}^{8} \sum_{j=1}^{8} b'_{ij}/64 \tag{14}$$

With equations (13) and (14), the average value of a color evaluating value regarding one region is calculated as the picture color evaluating value, which is the color evaluating value regarding an entire picture, by dividing the total sum of each color evaluating value $r'_{ij}$ and $b'_{ij}$ provided from color evaluating value adjusting circuit 70 by the number of regions.

Gain control circuits 29 and 30 control the gains of R amplifying circuit 4 and B amplifying circuit 5 so that picture color evaluating values $V_r$ and $V_b$ are both 0. Thus, white balance adjustment is completed when picture color evaluating values $V_r$ and $V_b$ both become 0.

Figure 23A:
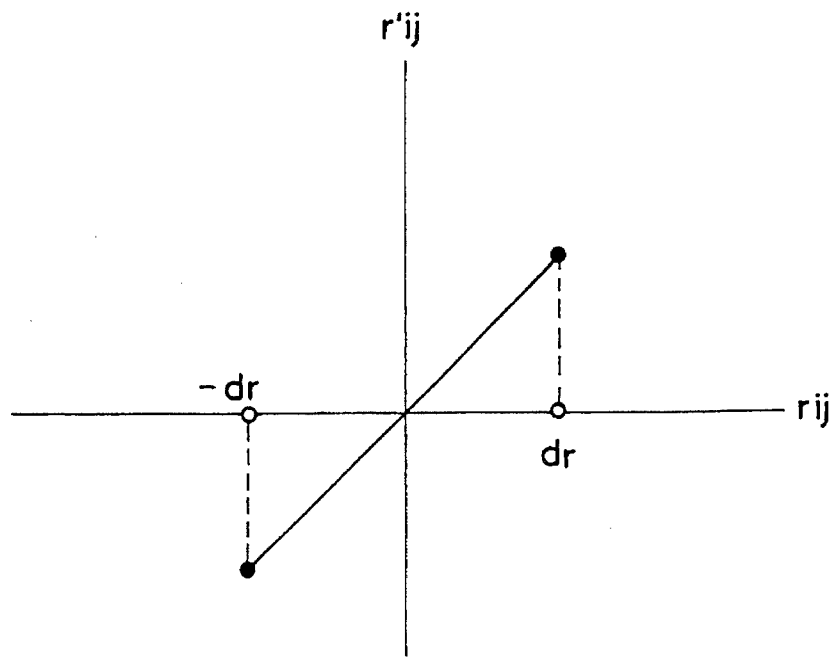
FIGS. 23A and 23B are graphs for explaining another operation principle of the seventh embodiment of FIG. 20.
Figure 23B:
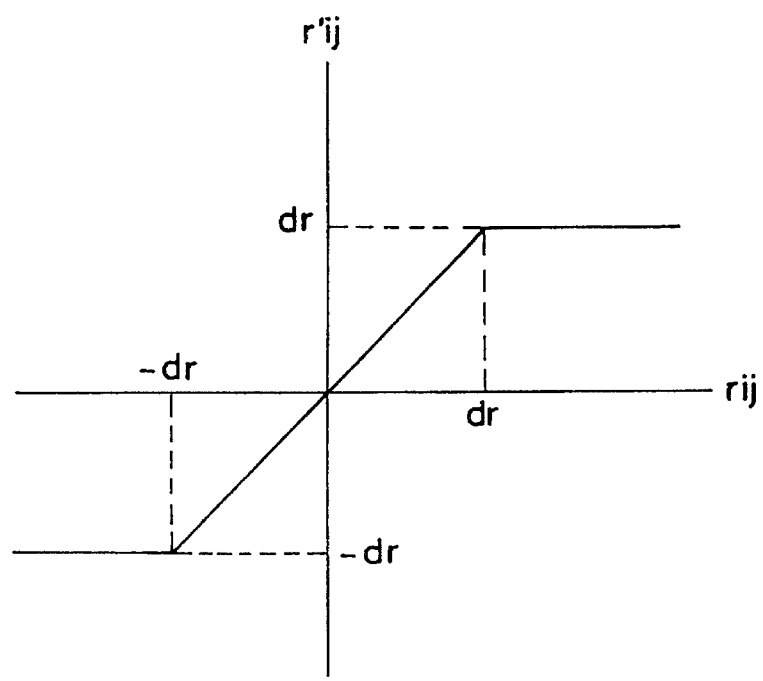

It is possible to change the functions as shown in FIGS. 22A and 22B to nullify the color evaluating values of high chroma region, i.e., substituting 0 for the color evaluating values, as shown in FIG. 23A, or fixing the color evaluating values of a high chroma region to a constant value, as shown in FIG. 23B.

Although determination has been made regarding the magnitude of the threshold value against each color evaluating value in the above mentioned seventh embodiment, it is possible to set a threshold value with respect to the sum of the square of both color evaluating values, i.e. $(r_{ij})^2 + (b_{ij})^2$ to limit the contribution degree regarding white balance adjustment.

By correcting the amplified portions of amplifying circuits 4 and 5, it is possible to calculate the color difference signals of the original signal and determine the existence of a high chroma region using these color difference signals.

Although the color evaluating value itself is directly corrected according to the adjusting process by color evaluating value adjusting circuit 70 in the embodiment of FIG. 20, it is possible to obtain equivalent results by weighing the color evaluating values by a constant weighing amount dp (for example $r_{ij} \times dp$) in general states, whereas reducing the weighing amount regarding high chroma color evaluating values.

In accordance with the seventh embodiment of the present invention, it is possible to suppress the offset of white balance intense in the side of the complementary color of the high chroma components by reducing the contribution degree of the object's high chroma components regarding the picture evaluation for achieving white balance adjustment.

Figure 24:
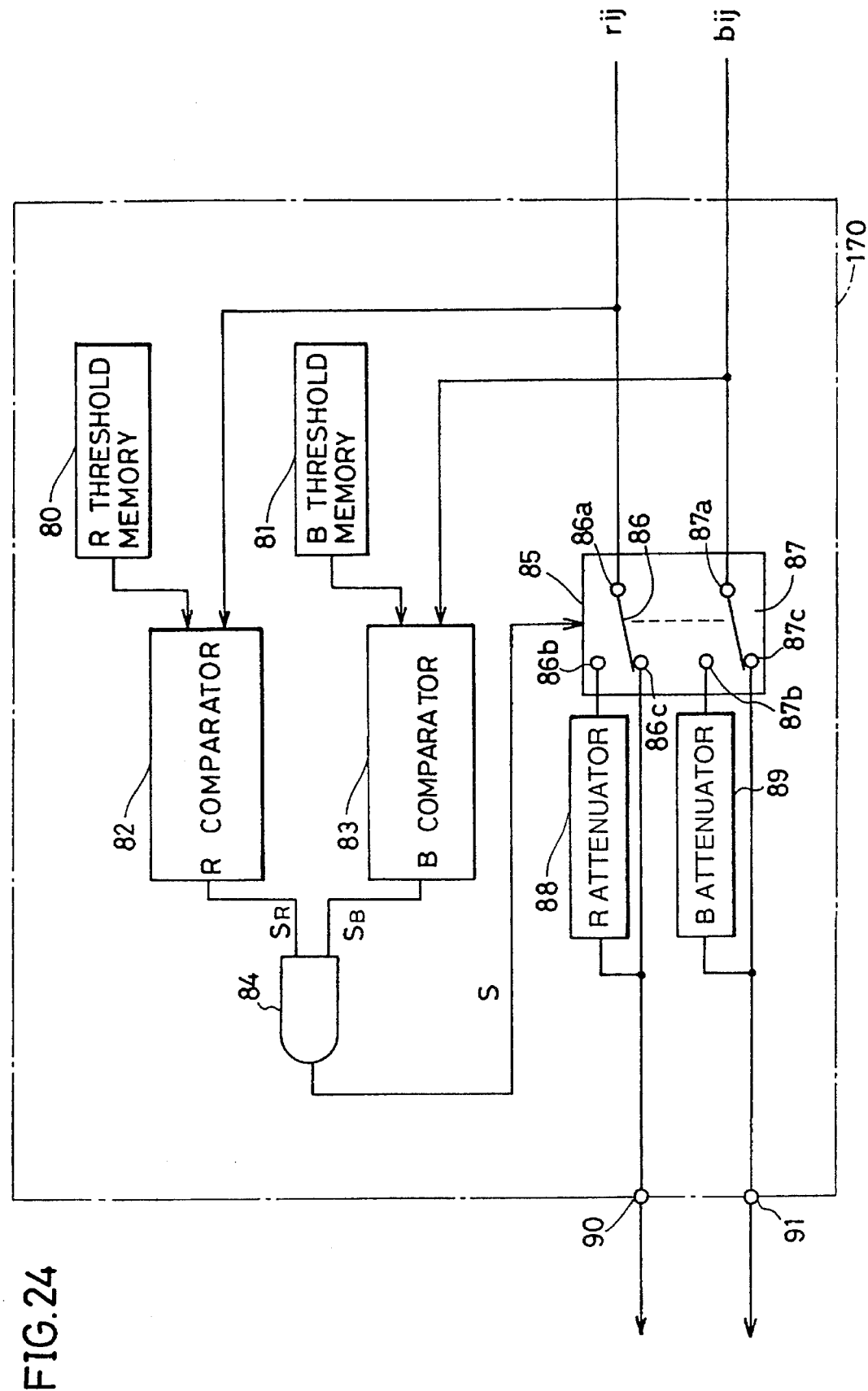
FIG. 24 is a block diagram of a color evaluating value adjusting circuit in detail of a white balance adjusting apparatus of an eighth embodiment of the present invention.

FIG. 24 is a block diagram showing a color evaluating value adjusting circuit 170 in accordance with an eighth embodiment of the present invention, corresponding to the color evaluating value adjusting circuit 70 of FIG. 20. The white balance adjusting apparatus of the present embodiment is similar to that of the seventh embodiment of FIG. 20, except for color evaluating value adjusting circuit 170. The indications and descriptions of the same elements will be omitted.

The latest color evaluating values $r_{ij}$, $b_{ij}$ provided from memory 26 of FIG. 20 are provided to the color evaluating value adjusting circuit 170 of FIG. 24. Color evaluating value adjusting circuit 170 determines whether the object in that region is green or not from the color evaluating values of each region, to reduce the levels of the corresponding color evaluating values by a predetermined amount P when green is detected.

Referring to FIG. 24, color evaluating values $r_{ij}$ and $b_{ij}$ of each region are provided to a R comparator 82 and a B comparator 83 to be compared with R and B threshold values Nr and Nb stored in a R threshold memory 80 and a B threshold memory 81, respectively. When the color evaluating values are smaller than the corresponding threshold values, comparators 82 and 83 generate comparison signals $S_R$ and $S_B$, respectively, of the H level. Because these comparison signals are applied to the two inputs of an AND circuit 84, a switching signal S of the H level is provided from AND circuit 84 to switching circuit 85, only when comparison signals $S_R$ and $S_B$ of the H level are both generated.

R and B threshold values Nr and Nb are set in advance as threshold values for identifying that an object is green. That is to say, it is possible to identify green objects by setting both R and B threshold values Nr and Nb as 0, considering that the two color difference signals of the region including the green object are both negative and included in the third quadrant of FIG. 2.

Referring to FIG. 24, switching circuit 85 is implemented by two switches 86 and 87. Switch 86 functions as to selectively connect a fixed contact 86a to which color evaluating value $r_{ij}$ is applied to a fixed contact 86b coupled to a R attenuator 88 or a fixed contact 86c coupled to an output terminal 90. Switch 87 functions to selectively connect a fixed contact 87a to which color evaluating value $b_{ij}$ is applied to a fixed contact 87b coupled to a B attenuator 89 or a fixed contact 87c coupled to output terminal 91.

Switches 86 and 87 are controlled by switching signal S from AND circuit 84. When switching signal S is at the L level, switches 86 and 87 are turned to the sides of fixed contacts 86c and 87c, respectively, whereby color evaluating values $r_{ij}$ and $b_{ij}$ are directly provided to output terminals. 90 and 91. When switching signal S is at the H level, switches 86 and 87 are turned to the sides of fixed contacts 86b and 87b, whereby color evaluating values $r_{ij}$ and $b_{ij}$ are applied to R and B attenuators 88 and 89, respectively.

R and B attenuators 88 and 89 subtract a predetermined constant amount P from the applied color evaluating values $r_{ij}$ and $b_{ij}$. The calculated $r_{ij}-P$ and $b_{ij}-P$ are provided to output terminals 90 and 91. Constant amount P is a value obtained by an experiment in advance that can properly identify that unnatural picture quality is not obtained when taking a green object.

Next, the operation of the above mentioned color evaluating value adjusting circuit 170 will be described. When color evaluating values $r_{ij}$ and $b_{ij}$ of a certain region are provided to color evaluating value adjusting circuit 170, these color evaluating values are respectively compared with R threshold value and B threshold value. When both of these color evaluating values are smaller than the corresponding threshold values, determination is made that the object is green and switching signal S is provided to switching circuit 85. As a result, the color evaluating values are both attenuated by a constant amount P by R and B attenuators 88 and 89, respectively, and provided from output terminals 90 and 91. When at least either of the color evaluating values $r_{ij}$ or $b_{ij}$ is sufficiently larger than the corresponding threshold value, determination is made that the object is not green, and both the color evaluating values are directly provided from output terminals 90 and 91 without being attenuated.

The color evaluating values, attenuated or not attenuated, provided from output terminals 90 and 91 are applied to picture evaluating circuit 71 of FIG. 20 to calculate color evaluating values $V_R$ and $V_B$ of the entire picture according to these color evaluating values. The rest of the operation is identical to that of the seventh embodiment of FIG. 20, so that the description thereof will be omitted.

Figure 25:
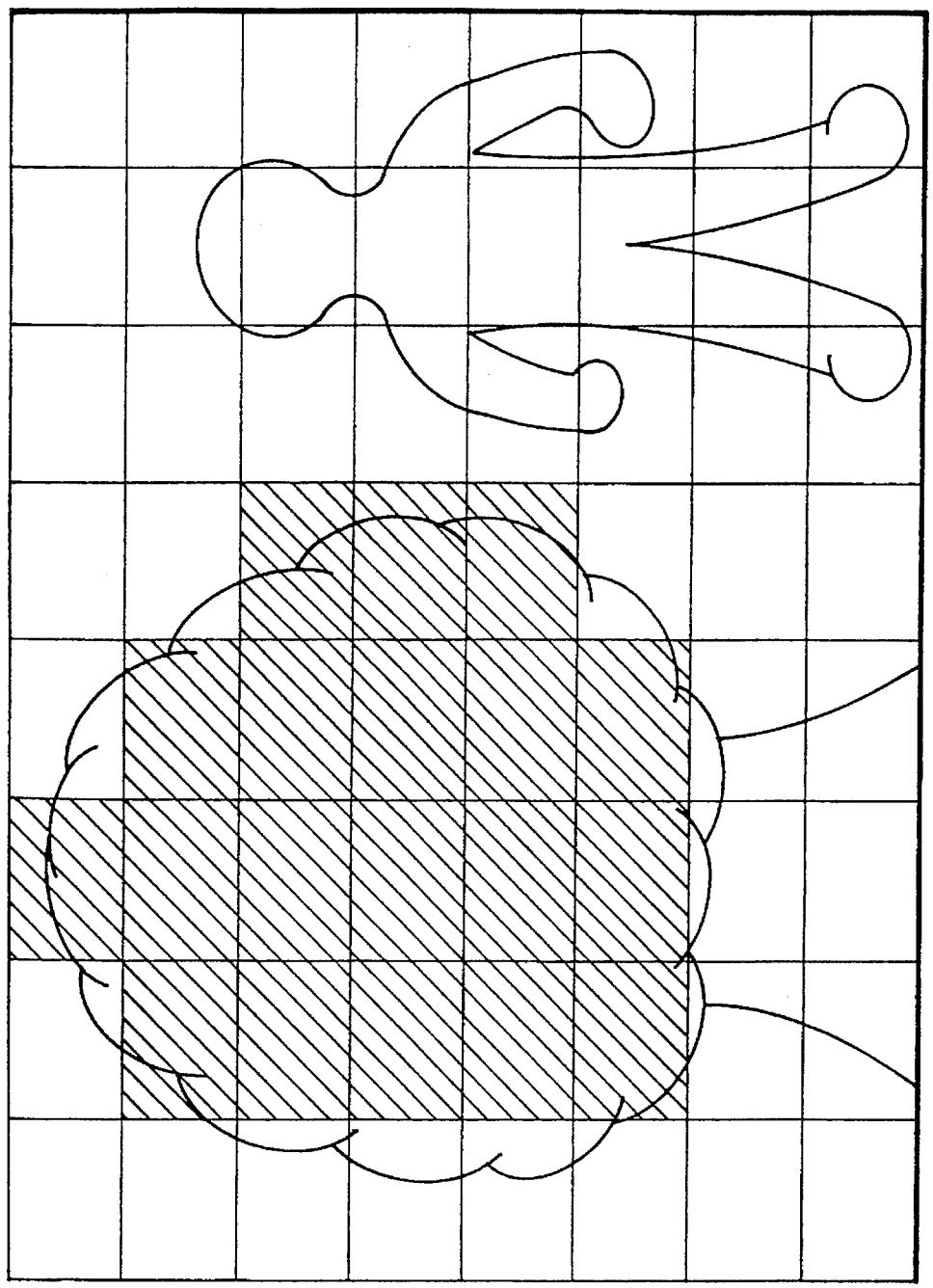
FIG. 25 is a schematic diagram for explaining the operation of the eighth embodiment of FIG. 24.

With reference to the image sensed picture of FIG. 25, the meaning of the aforementioned automatic white balance adjustment operation will be explained. FIG. 25 shows the case where the leaves of a tree occupy a large area of the entire picture and the color distribution is not even. If the color evaluating values of the region of green are not attenuated, white balance will be offset in the direction to cancel green.

In the above eighth embodiment, the picture is divided and only the color evaluating values of the green color regions are attenuated to reduce the contribution degree of the color evaluating values of the regions in the hatched area of FIG. 25 towards the picture color evaluating values. As a result, the picture evaluating values are not intense in the green color side so that proper white balance adjustment can be performed.

Regarding the method to reduce the contribution degree of the color evaluating values of each region towards the entire picture, there are methods other than the above mentioned method of directly reducing the color evaluating value of each region. There is a method of applying a predetermined weighing amount for each region and reducing only the weight of the green regions.

It is also possible to implement the determination whether a green object exist or not using fuzzy inference, considering that the determination itself is considerably vague.

According to the eighth embodiment of the present invention, white balance is not offset in the direction of cancelling green to perform appropriate white balance adjustment, even in the case where a scene comprising a large area of green object not suitable for white balance adjustment is taken.

Figure 26:
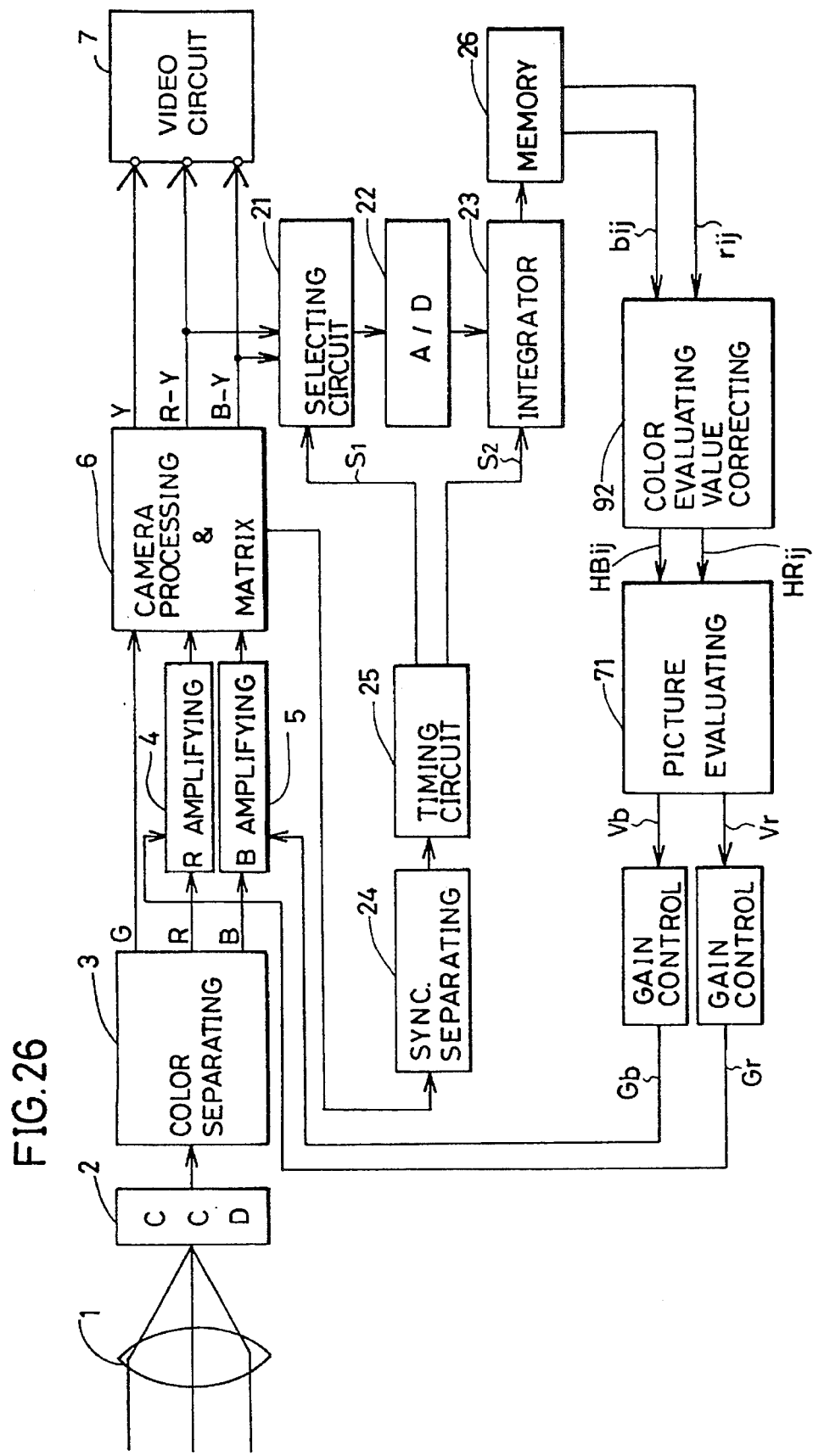
FIG. 26 is a block diagram of a white balance adjusting apparatus of a ninth embodiment of the present invention.

FIG. 26 is a block diagram showing an automatic white balance adjusting apparatus of a ninth embodiment of the present invention. The ninth embodiment of FIG. 26 is similar to the seventh embodiment of FIG. 20 except for the following point. That is to say, a color evaluating value correcting circuit 92 is provided instead of the color evaluating value adjusting circuit 70 of FIG. 20.

Referring to FIG. 26, the latest color evaluating values $r_{ij}$ and $b_{ij}$ held in memory 26 are provided to color evaluating value correcting circuit 92 of the succeeding stage. Color evaluating value correcting circuit 92 determines as to whether the color evaluating values of each region is included within the appropriate color temperature distribution range indicated by the hatched region of FIG. 27. When not within the range, color evaluating values correction circuit 92 functions to apply correction of the corresponding color evaluating values in a direction perpendicular to the color temperature distribution direction, as shown in FIG. 28.

The correcting procedure of the color evaluating values according to this ninth embodiment will be described more specifically. Considering the relationship between the color temperature variation of the light source and each color difference signal, the color difference signal varies as stated before along the light source color temperature axis of FIG. 2 when the color temperature of the light source directed to a white object changes.

Figure 28:
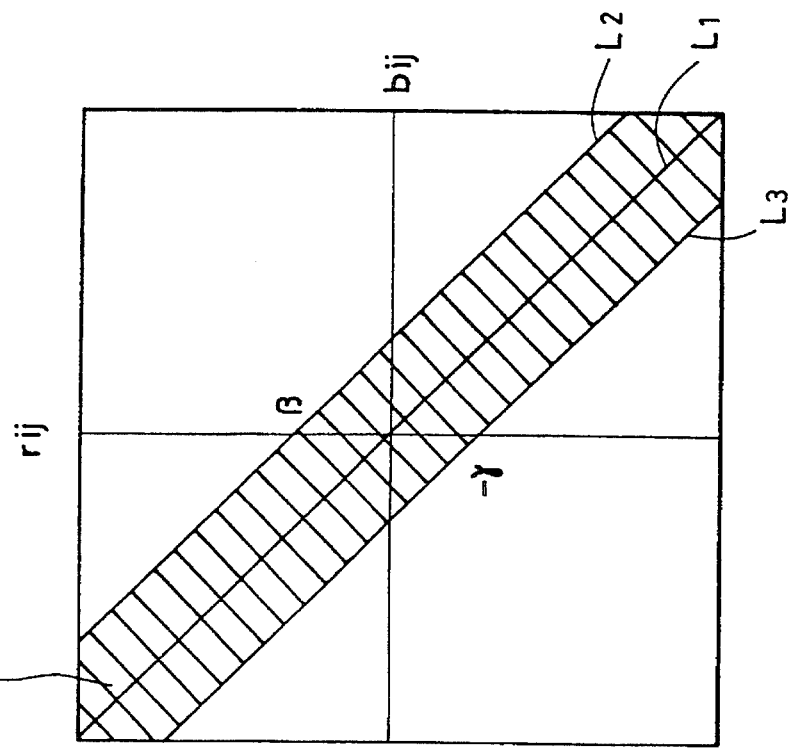
FIGS. 27, 28 and 29 are graphs for explaining the operation principle of the ninth embodiment of FIG. 26.
Figure 27:
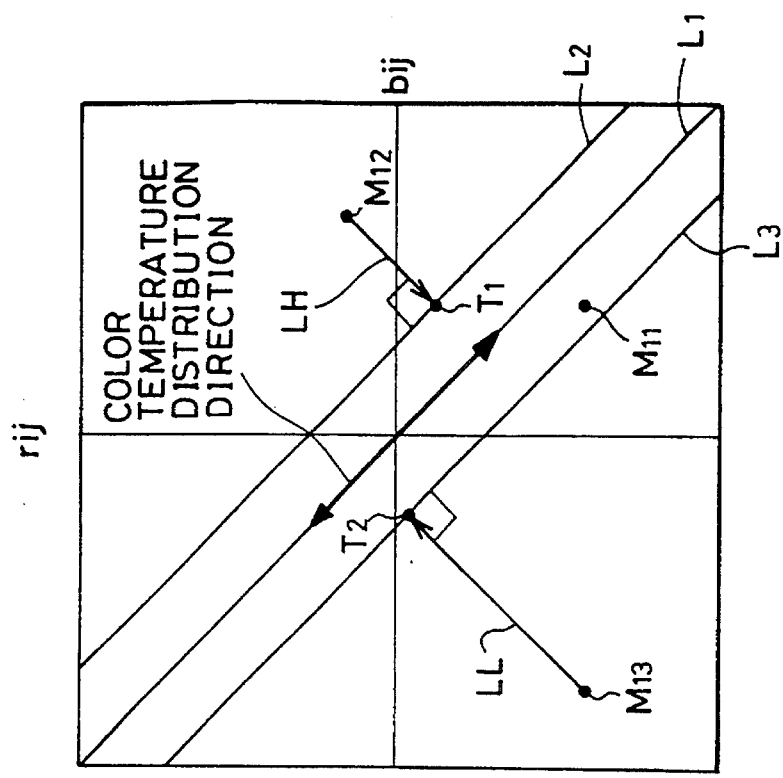

With the color evaluating value $b_{ij}$ of B-Y as the abscissa and the color evaluating value $r_{ij}$ of R-Y as the ordinate (Y axis), a line L1 with inclination $\alpha$ of FIGS. 27 and 28 is obtained by approximating the light source color temperature axis on the coordinate axis. This straight line is represented by the following equation:

$$Y=\alpha X \tag{15}$$

The direction of line L1 corresponds to the color temperature distribution direction. With straight line L1 as the center, the hatched region can be set as the color temperature distribution range where inconvenience is not subjected to white balance, that is, as the allowable appropriate color temperature distribution range. More specifically, this range is a region enclosed by two straight lines L2 and L3 which are straight line L1 shifted in the positive and negative directions of Y axis by $\beta$, $\gamma$ ($\beta<\gamma$). Straight lines L2 and L3 are expressed by the following equations.

$$L2: Y=\alpha X+\beta \tag{16}$$

$$L3: Y=\alpha X-\gamma \tag{17}$$

The operation of color evaluating value correction is carried out using the coordinate with the two straight lines L2 and L3 in color evaluating value correcting circuit 92.

First, color evaluating values $b_{ij}$ and $r_{ij}$ entered for each region are retrieved from memory 26 and plotted on the axis as $(b_{ij}, r_{ij})$. Then, determination is made whether the plotted point is within the appropriate color temperature distribution range or not. If within the range, the corresponding color evaluating values are not corrected, and provided as the new color evaluating values $HB_{ij}$, $HR_{ij}$.

If plotted point $M_{11}$ ($b_{11}$, $r_{11}$) regarding region $A_{11}$ is within the color temperature distribution range as shown in FIG. 28, the color evaluating values from memory 26 are directly provided as $HB_{11}=b_{11}$, $HR_{11}=r_{11}$.

When the plotted point is located in the region above line L2 outside the color temperature distribution range, a perpendicular line is drawn to line L1 from the plotted point, whereby the coordinate values of the intersection of this vertical line and line L2 are provided as the new color evaluating value $HB_{ij}$, $HR_{ij}$.

For example, if the plotted point $M_{12}$ ($b_{12}$, $r_{12}$) regarding region $A_{12}$ is located at a position indicated in FIG. 28, perpendicular line LH expressed by:

$$Y=(-1/\alpha)\cdot(X-B_{12})+R_{12} \qquad (18)$$

is drawn. Intersection T1 of this vertical line LH and line L2 is obtained by equations (16) and (18), whereby the coordinate of this intersection (X1, Y1) are provided as the new color evaluating values $HB_{12}$ and $HR_{12}$.

More specifically, $$HB_{12}=(b_{12}+\alpha r_{12}-\alpha\beta)/(\alpha^2+1)$$

$$HR_{12}=\alpha\cdot(b_{12}+\alpha r_{12}-\alpha\beta)/(\alpha^2+1)+\beta$$

When the plotted point is outside the color temperature distribution range and located in a region below line L3, a perpendicular line is drawn from this plotted point to line L1, whereby the coordinate value of the intersection of this vertical line and line L3 is provided as the new color evaluating values $HB_{ij}$, $HR_{ij}$.

For example, if plotted point $M_{13}$ ($b_{13}$, $r_{13}$) regarding region $A_{13}$ is at the location indicated in FIG. 28, perpendicular line LL expressed by:

$$Y=(-1/\alpha)\cdot(X-B_{13})+R_{13} \qquad (19)$$

is drawn. Intersection T2 of perpendicular line LL and line L3 are obtained by equations (17) and (19), whereby the coordinate of this intersection (X2, Y2) is provided as the new color evaluating values $HB_{13}$, $HR_{13}$.

More specifically, $$HB_{13}=(b_{13}+\alpha r_{13}+\alpha\gamma)/(\alpha^2+1)$$

$$HR_{13}=\alpha\cdot(b_{13}+\alpha r_{13}+\alpha\gamma)/(\alpha^2+1)-\gamma$$

The corrected or not corrected new color evaluating values $HR_{ij}$ and $HB_{ij}$ provided from color evaluating value correcting circuit 92 are provided to picture evaluating circuit 71, where color evaluating values $V_r$ and $V_b$ of the entire picture regarding respective color difference signals are calculated using the following equations (20) and (21) according to the above mentioned color evaluating values.

$$V_r = \sum_{i=1}^{8}\sum_{j=1}^{8} HR_{ij}/64 \qquad (20)$$

$$V_b = \sum_{i=1}^{8}\sum_{j=1}^{8} HB_{ij}/64 \qquad (21)$$

The description of the remaining operation is similar to that of the seventh embodiment of FIG. 20, and will be omitted.

A method other than the color evaluating value correcting method shown in FIG. 28 may be employed, where correction is applied in the direction of the origin with respect to plotted points located outside the appropriate color temperature distribution range.

That is to say, instead of drawing a line perpendicular to straight line L1, the plotted point is connected to the origin by straight lines L4 or L5, whereby the X component and the Y component of the coordinates of T3 or T4 which is the intersection of straight line L4 or L5 and straight line L2 or L3 can be provided as the new color evaluating values $HB_{ij}$, $HR_{ij}$.

For example, regarding region $A_{12}$, straight line L4 is expressed as:

$$Y=(r_{12}/b_{12})\cdot X$$

With this equation and equation (16), the coordinate of intersection T3 is calculated as:

$$(d/(r_{12}/b_{12}-\alpha), \beta\cdot r_{12}/(r_{12}-\alpha\cdot b_{12}))$$

that is, $$HB_{12}=\beta/(r_{12}/b_{12}-\alpha)$$

$$HR_{12}=\beta\cdot r_{12}/(r_{12}-b_{12})$$

Figure 30:
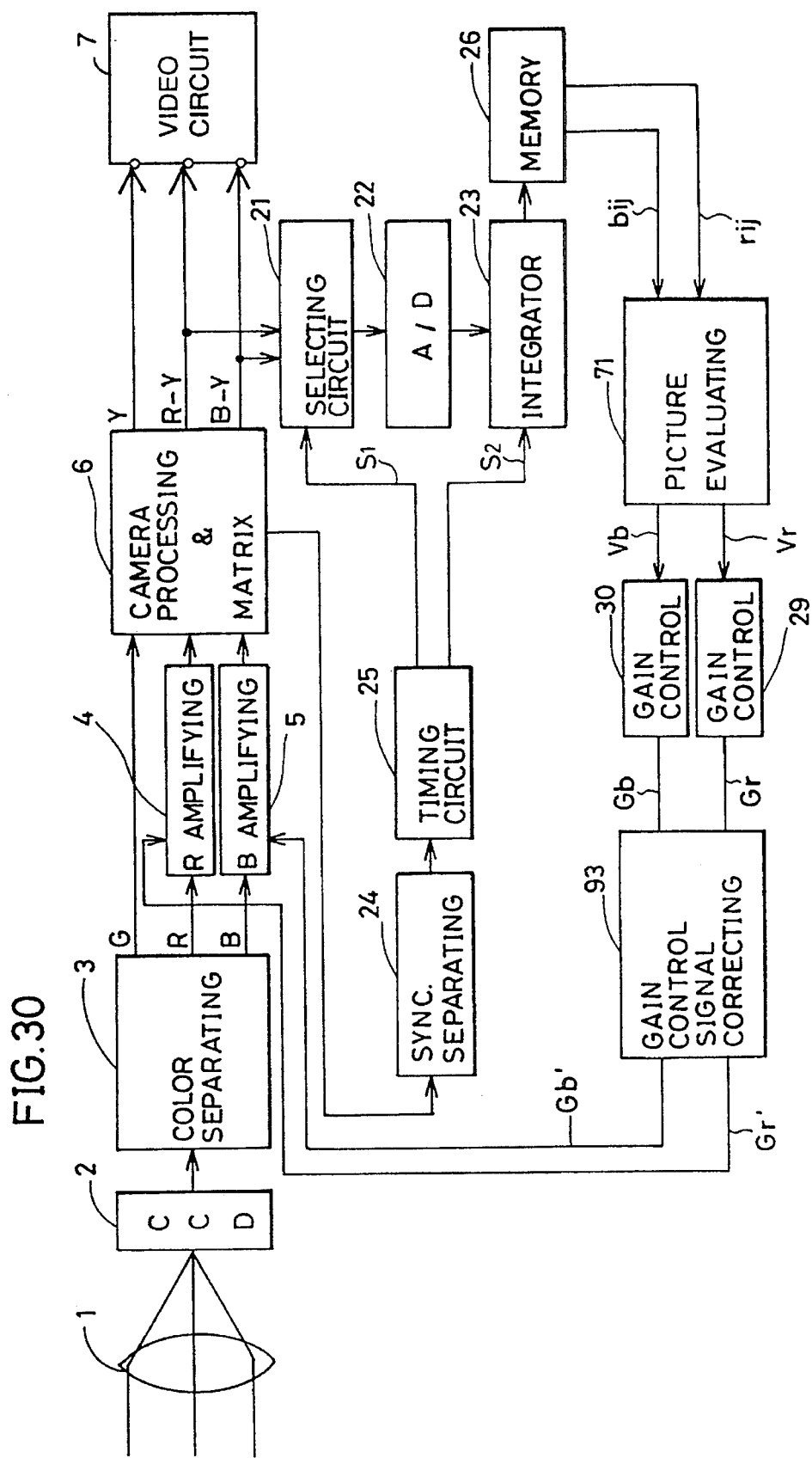
FIG. 30 is a block diagram of a white balance adjusting apparatus of a tenth embodiment of the present invention.

Although correction is applied directly to the color evaluating values so that the color evaluating values of each region all are included within the appropriate color temperature distribution range in the ninth embodiment of FIG. 26, it is possible to correct the gain control signal so that gain control signals $G_r$ and $G_b$ provided from gain control circuits 29 and 30 are included within the color temperature distribution range, as shown in the tenth embodiment of FIG. 30.

In the tenth embodiment of FIG. 30, the color evaluating value correcting circuit 92 of FIG. 26 is removed so that no correction is applied to the color evaluating values provided from memory 26. They are provided to picture evaluating circuit 71 as $HR_{ij}=r_{ij}$, $HB_{ij}=b_{ij}$. A gain control signal correcting circuit 93 is inserted at the succeeding stage of gain control circuits 29 and 30 instead.

Figure 31:
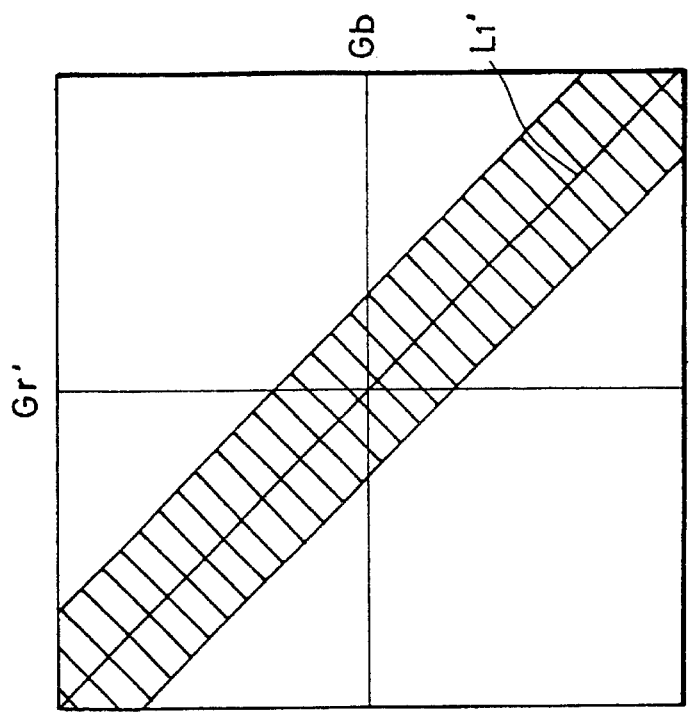
FIGS. 31, 32, 33 and 34 are graphs for explaining the operation principle of the tenth embodiment of FIG. 30.
Figure 29:
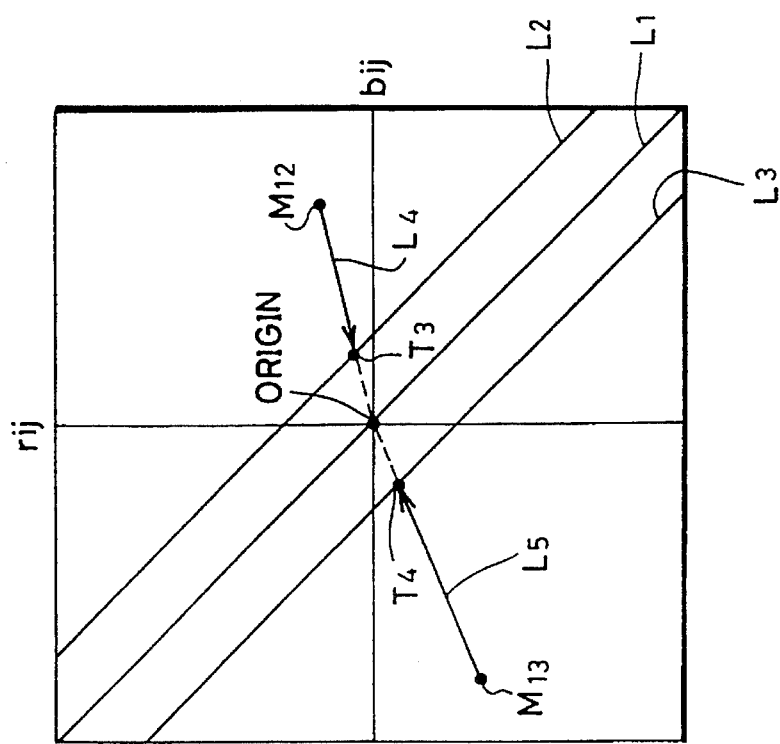

The correction procedure by gain control signal correcting circuit 93 is similar to that of the aforementioned color evaluating value correction. That is to say, the relationship between gain control signals $G_r$ and $G_b$ and the appropriate color temperature distribution range is as shown in FIG. 31, whereby the color temperature distribution range is the region enclosed by two straight lines which are the approximate straight line L1' shifted in the Y axis direction. Therefore, if the plotted point of gain control signals $G_r$ and $G_b$ are outside the color temperature distribution range as M3 or M4 of FIG. 32, a perpendicular line is drawn from the plotted point to straight line L1' to obtain the intersection with the closer straight line. The obtained coordinate of the intersection are derived as the modified gain control signals $G'_r$ and $G'_b$ to control the gains of R and B amplifying circuits 4 and 5.

Figure 32:
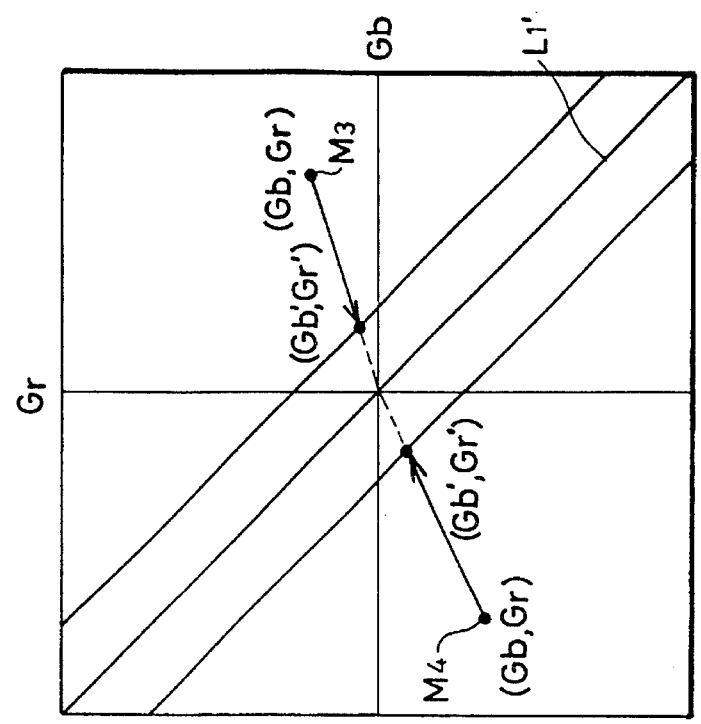
Figure 33:
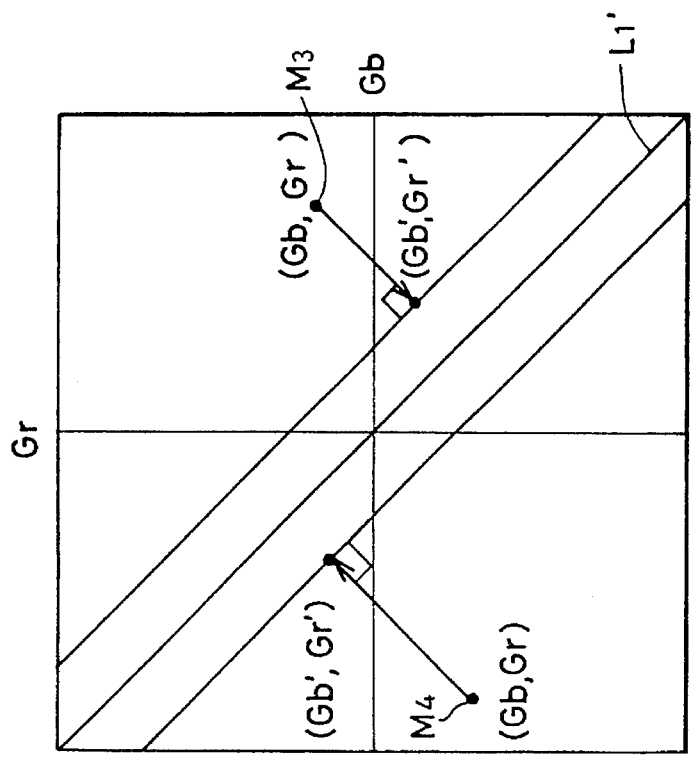
Figure 34:
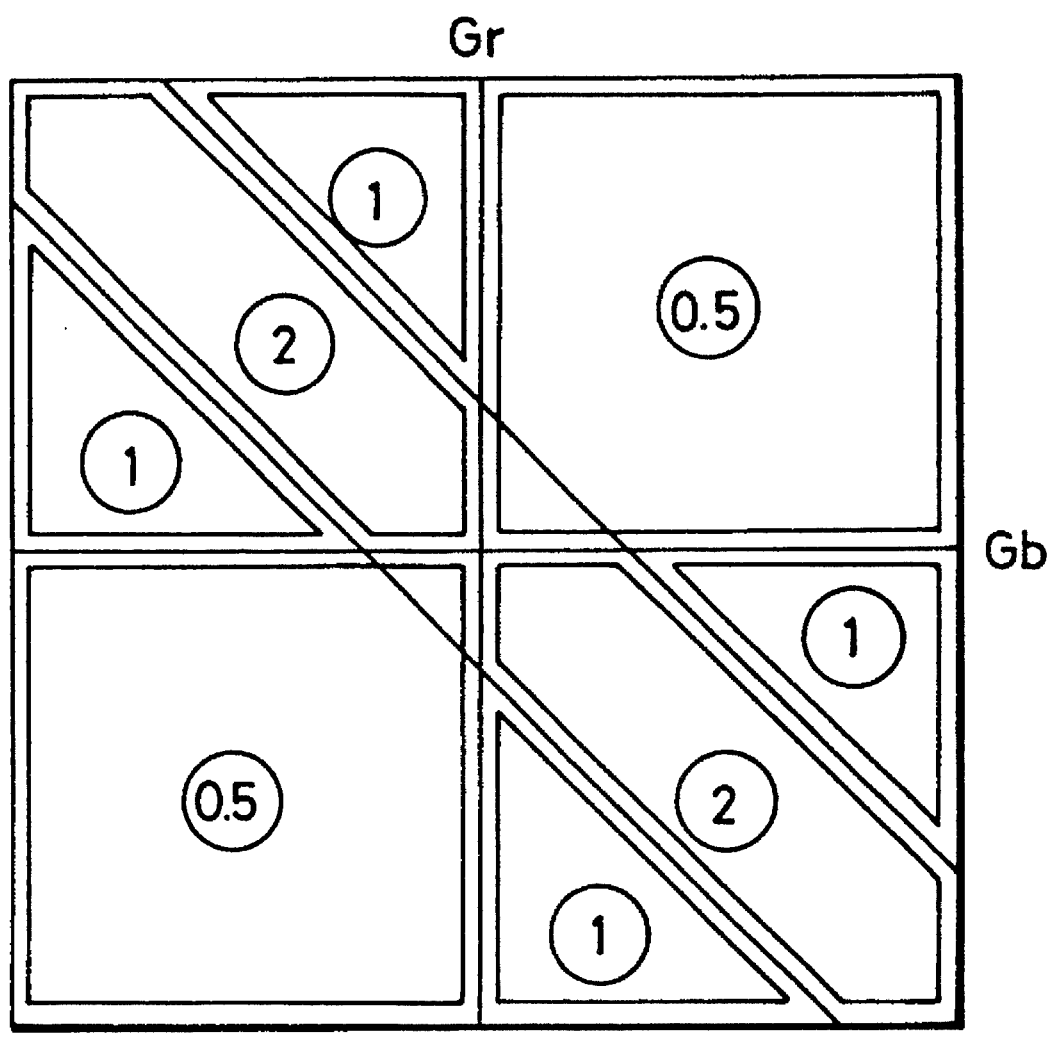

As another correcting method, it is possible to draw a straight line from the plotted point to the origin as shown in FIG. 33, to obtain the intersection of this straight line and the closer straight line, whereby the obtained coordinate of this intersection are used as the modified color control signals $G'_r$ and $G'_b$. There is a still further method where the axis of coordinate of FIG. 32 is used as a table for determining the weighing amount D. Referring to FIG. 34, the weighing amount D is set as D=2 within the appropriate color temperature distribution range, as D=1 in second and fourth quadrants outside the appropriate color temperature distribution range, and as D=0.5 in the first and third quadrants outside the appropriate color temperature distribution range. The weighing amount D is determined according to the location of each plotted point of the gain control signals, whereby gain control signals $G_r$ and $G_b$ are corrected as below:

$$G'_r = D \cdot G_r$$

$$G'_b = D \cdot G_b$$

By such weighing, the color information within the appropriate color temperature distribution range is given weight to obtain similar effect as the method using the aforementioned perpendicular lines.

It is understood that the color evaluating value correction of the ninth embodiment and the gain control signal correction of the tenth embodiment may be carried out simultaneously.

According to the ninth and tenth embodiments, white balance is not offset, and will implement appropriate white balance adjustment, even when a scene including colors outside the color temperature distribution range not suitable for white balance adjustment is taken.

Although the update period of the evaluating value of each signal component is 2 or 3 fields in the above mentioned first to tenth embodiments due to implementation of a color difference signal or a luminance signal selection for each field by selecting circuit 21 as the result of one A/D converter 22 commonly used. It is possible to update each evaluating value for every 1 field if an A/D converter and an integrator are provided for each luminance signal and color difference signal, to obtain white balance adjustment of higher accuracy.

Although color difference signals R-Y and B-Y are used as color information signals for white balance adjustment according to the above mentioned embodiments, it is possible to use signals of R and B supplied from the color separating circuit 3 in evaluating unevenness of color regarding red or blue component. More specifically, color evaluating values can be obtained by integrating respective ones of R and B signals for each of 64 regions.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A white balance adjusting apparatus for automatically adjusting white balance based on red, green, and blue signals of an image, comprising:

means for amplifying the red and blue signals each with a corresponding variable gain so as to yield amplified red and blue signals, respectively;

means for converting said amplified red and blue signals into a plurality of color difference signal;

means for dividing each of the plurality of color difference signals into a plurality of regions;

means, responsive to said dividing means, for integrating respective values of each of the plurality of color difference signals so as to convert the respective values of the plurality of color difference signals into a plurality of color evaluating values corresponding to each one of the regions;

means, responsive to each of the color evaluating values of each of said regions, for calculating a picture color evaluating value of the entire image for each one of said color difference signals;

means for controlling the variable gain in response to said picture color evaluating value, said means for controlling including means for varying a rate of change of the variable gain in response to a size of a portion of the image, said portion of the image containing individual ones of said regions wherein for each one of said individual ones of said regions, an amount of fluctuation between corresponding color evaluating values for said each one of said regions and an adjacent one of the regions is less than a reference value.

2. A white balance adjusting apparatus according to claim 1, wherein said means for varying comprises:

means for ceasing white balance adjustment by a current one of the color evaluating values when the size of the image portion exceeds a predetermined value and performing white balance adjustment with prior evaluating values.

3. The white balance adjusting apparatus according to claim 1, wherein the means for varying comprises:

means for counting a number of times each of the color evaluating values for successive ones of the regions in said image is less than the color evaluating value of a preceding region by the reference value so as to produce a count value; and means, responsive to said count value, for generating a signal for changing the rate of change of said variable gain.

4. The white balance adjusting apparatus according to claim 1, wherein said integrating means comprises:

means for digitally integrating each of said plurality of color difference signals by one field period so as to yield a digitally integrated value; and memory means for holding the digitally integrated value for each corresponding one of the color difference signals.

5. A white balance adjusting apparatus for automatically adjusting white balance based on color information signals of an image, comprising:

means for amplifying red and blue signals, contained within the color information signals, with a corresponding variable gain so as to yield amplified color information signals;

means for converting said amplified color information signals into a plurality of color difference signals;

means for dividing each of the plurality of color difference signals into a plurality of regions;

means, responsive to said dividing means, for integrating respective values of each of the plurality of color difference signals so as to convert the respective values of color difference signals into a plurality of color evaluating values corresponding to each one of the regions;

means, responsive to each of the color evaluating values of each of said regions, for calculating a picture color evaluating value of the entire image for each one of the color information signals;

means for controlling the variable gain in response to said picture color evaluating value, said means for controlling including means for varying a rate of change of the variable gain in response to a size of a portion of the image, said portion of the image containing individual ones of said regions wherein for each one of said individual ones of said regions, an amount of fluctuation between corresponding color evaluating values for said each one of said regions and an adjacent one of the regions is less than a reference value.

6. In an imaging apparatus having an image sensor with a color separating circuit receiving a photo-electric signal and producing green, red, and blue signals based on the photo-electric signal, a first adjustable gain amplifier providing an amplified first color signal based on a first one of the red, blue, and green signals produced by the color separating circuit and a gain control input, a second adjustable gain amplifier providing an amplified second color signal based on a second one, differing from the first one, of the red, blue, and green signals produced by the color separating circuit and a gain control input, and a camera processing circuit provided with a third one, differing from the first and second ones, of the red, blue, and green signals from the color separating circuit, the amplified first color signal from the first adjustable gain amplifier, and the amplified second color signal from the second adjustable gain amplifier, and producing a luminance signal, a first color difference signal, and a second color difference signal, a white balance adjusting apparatus for automatically adjusting white balance in response to the first and second color difference signals produced by the camera processing circuit, the apparatus comprising:

a) a selector for selecting the luminance signal during a first time period, the first color difference signal during a second time period, and the second color difference signal during a third time period;

b) an integrator for dividing the one of the luminance signal, the first color difference signal, and the second color difference signal selected by the selector into a plurality of regional digital signals based on a plurality of regions and summing each of the plurality of regional digital signals over a corresponding one of the first, second, and third time periods, to produce a plurality of regional luminance evaluation factors, a plurality of regional first color evaluation factors, and a plurality of regional second color evaluation factors during the first, second, and third time periods;

c) a storage device for buffering the plurality of regional luminance, first color, and second color evaluation factors;

d) an image evaluator for producing a first color evaluation factor based on the plurality of regional first color evaluation factors and for producing a second color evaluation factor based on a plurality of regional second color evaluation factors;

e) a first color gain controller for providing a first gain control signal such that the first color evaluation factor will approach zero;

f) a second color gain controller for providing a second gain control signal such that the second color evaluation factor will approach zero;

g) a gain adjusting device for adjusting the first and second gain control signals based on a comparison of the color of all vertically and horizontally adjacent regions, wherein the first and second gain control signals, as adjusted by the gain adjusting device, are provided to the gain control inputs of the first and second adjustable gain amplifiers, respectively.

7. The apparatus of claim 6 wherein the gain adjusting device includes a counter including a count wherein, for each of the plurality of regions, the count is incremented by one each time vertically adjacent regions are found to be the same color and the count is incremented by one each time horizontally adjacent regions are found to be the same color, wherein an amount by which the gain adjusting device adjusts the first and second gain control signals is based on the count of the counter.

8. The apparatus of claim 7 wherein the gain adjusting device includes a multi-position switch, each position corresponding to a different amount of adjustment of the first and second gain control signals, wherein the switch assumes a position based on the count of the counter.

9. The apparatus of claim 7 wherein vertically adjacent regions are found to be the same when a difference between corresponding ones of the plurality of regional luminance evaluation factors is less than a first threshold, a difference between corresponding ones of the plurality of regional first color evaluation factors is less than a second threshold, and a difference between corresponding ones of the plurality of regional second color evaluation factors is less than a third threshold, and wherein horizontally adjacent regions are found to be the same when a difference between corresponding ones of the plurality of regional luminance evaluation factors is less than the first threshold, a difference between corresponding ones of the plurality of regional first color evaluation factors is less than the second threshold, and a difference between corresponding ones of the plurality of regional second color evaluation factors is less than the third threshold.

10. The apparatus of claim 6 wherein the first period is during a first frame period, the second period is during a second frame period which immediately follows the first frame period, and the third period is during a third frame period which immediately follows the second frame period.

* * * * *